United States Patent
Shibata

(10) Patent No.: US 9,801,069 B2
(45) Date of Patent: Oct. 24, 2017

(54) COMMUNICATION APPARATUS

(71) Applicant: Brother Kogyo Kabushiki Kaisha, Nagoya-shi, Aichi-ken (JP)

(72) Inventor: Hiroshi Shibata, Obu (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 85 days.

(21) Appl. No.: 14/792,684

(22) Filed: Jul. 7, 2015

(65) Prior Publication Data
US 2016/0007200 A1 Jan. 7, 2016

(30) Foreign Application Priority Data

Jul. 7, 2014 (JP) .................................. 2014-139646

(51) Int. Cl.
| | |
|---|---|
| *H04L 29/06* | (2006.01) |
| *H04W 12/08* | (2009.01) |
| *H04W 76/02* | (2009.01) |
| *H04W 84/12* | (2009.01) |
| *H04W 12/06* | (2009.01) |
| *H04W 12/02* | (2009.01) |

(52) U.S. Cl.
CPC .......... *H04W 12/08* (2013.01); *H04L 63/205* (2013.01); *H04W 76/02* (2013.01); *H04W 12/02* (2013.01); *H04W 12/06* (2013.01); *H04W 84/12* (2013.01)

(58) Field of Classification Search
CPC ..... H04W 12/08; H04W 76/02; H04W 12/02; H04W 84/12; H04W 12/06; H04L 63/205
See application file for complete search history.

(56) References Cited

U.S. PATENT DOCUMENTS

| | | | |
|---|---|---|---|
| 8,634,556 B2 | 1/2014 | Ikeda | |
| 9,191,881 B2* | 11/2015 | Benjamins | ............ H04W 48/12 |
| 2004/0043767 A1* | 3/2004 | Tsutsumi | .............. H04W 36/08 |
| | | | 455/432.1 |
| 2008/0176571 A1* | 7/2008 | Choi | ..................... H04W 36/26 |
| | | | 455/436 |
| 2009/0175446 A1 | 7/2009 | Ikeda | |
| 2014/0010225 A1* | 1/2014 | Puregger | ............... H04W 12/06 |
| | | | 370/338 |

(Continued)

FOREIGN PATENT DOCUMENTS

JP 2009-164971 A 7/2009

Primary Examiner — Mahfuzur Rahman
(74) Attorney, Agent, or Firm — Banner & Witcoff, Ltd.

(57) ABSTRACT

A communication apparatus may receive a first wireless profile and a second wireless profile from an access point after a wireless connecting operation for establishing a wireless connection in accordance with a predetermined wireless connection scheme has been performed, the first wireless profile being used in a first wireless network, and the second wireless profile being used in a second wireless network; may select a particular wireless profile from among the first wireless profile and the second wireless profile, the particular wireless profile being used in a wireless network having a relatively high security level among the first wireless network and the second wireless network; and may try to establish the wireless connection with the access point using the particular wireless profile. The particular wireless connection scheme may be a scheme for establishing the wireless connection without an identifier for authentication for establishing the wireless connection being inputted.

15 Claims, 11 Drawing Sheets

(56) References Cited

U.S. PATENT DOCUMENTS

2014/0098952 A1  4/2014 Ikeda
2014/0233374 A1* 8/2014 Elliott ................... H04W 48/16
                                                370/228

* cited by examiner

FIG. 5
(First Embodiment)
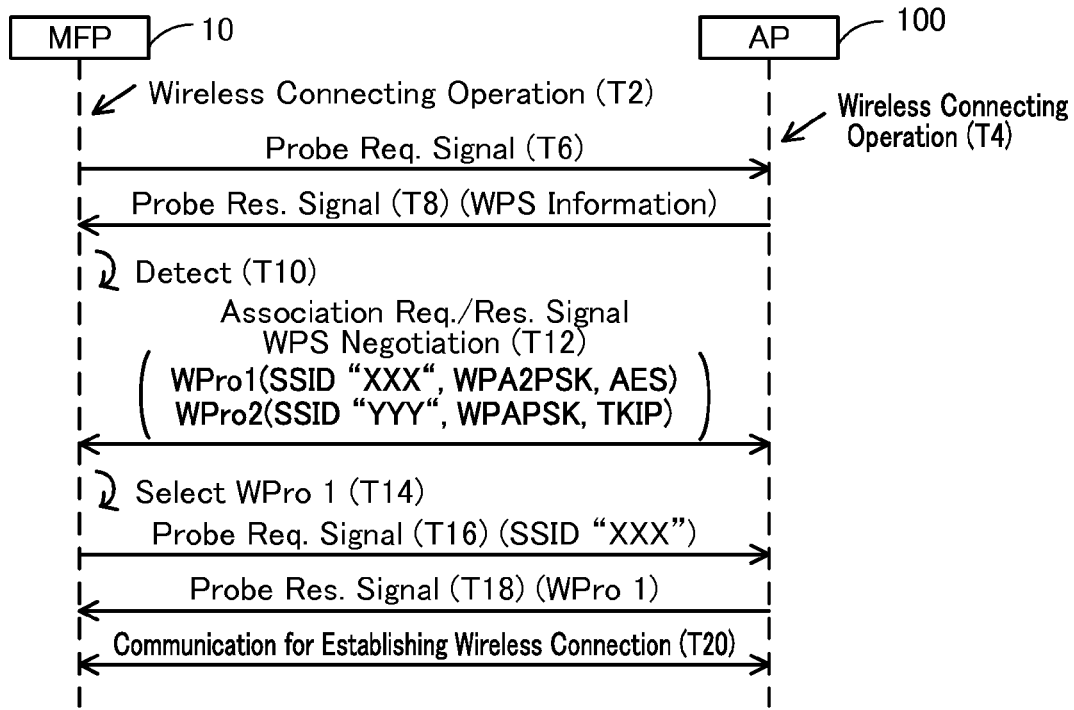
(Case A)  Authentication Scheme Ranking WPA2PSK>WPAPSK
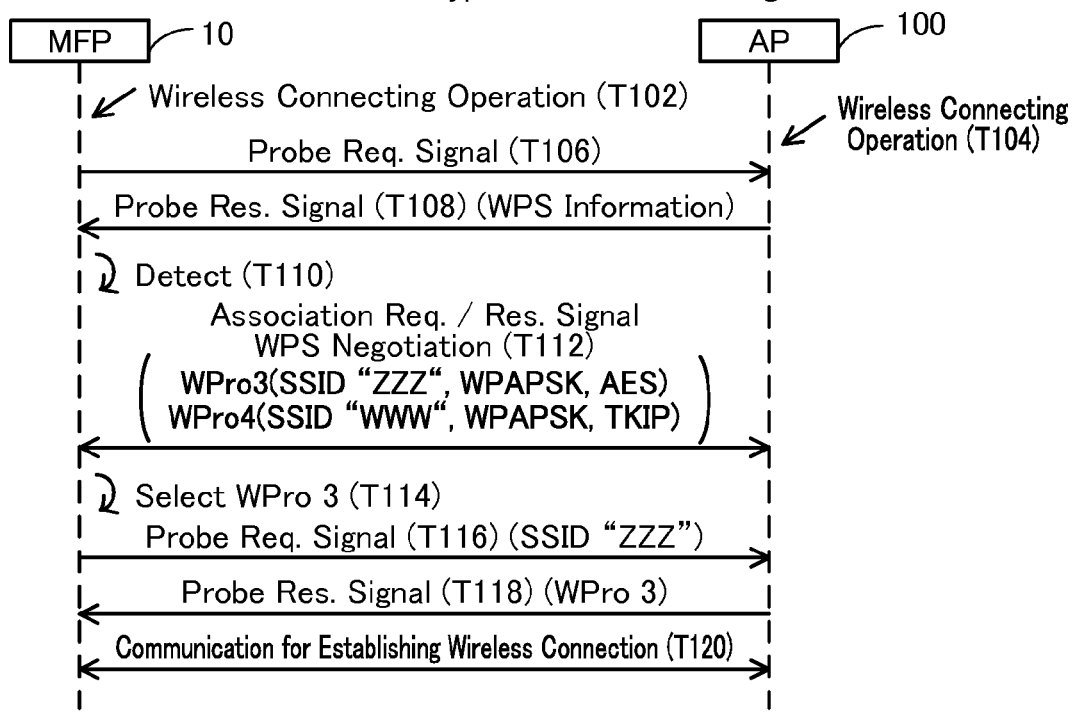
(Case B)  Encryption Scheme Ranking AES>TKIP

FIG. 6
(First Embodiment)
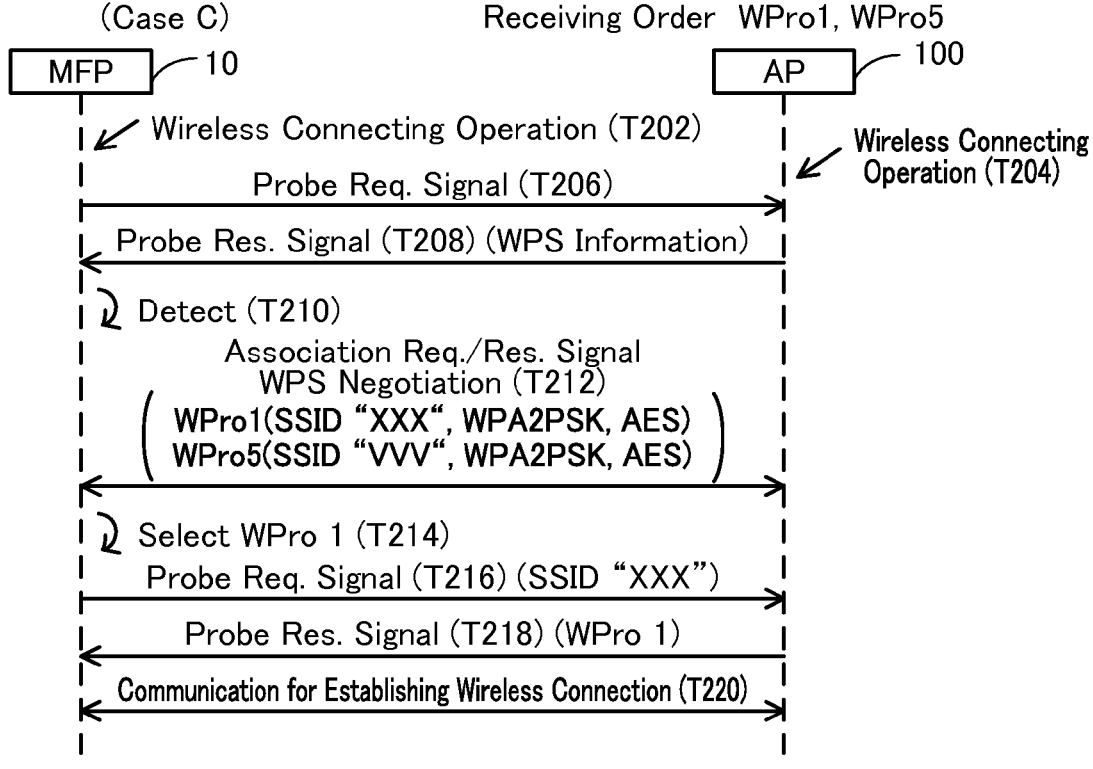
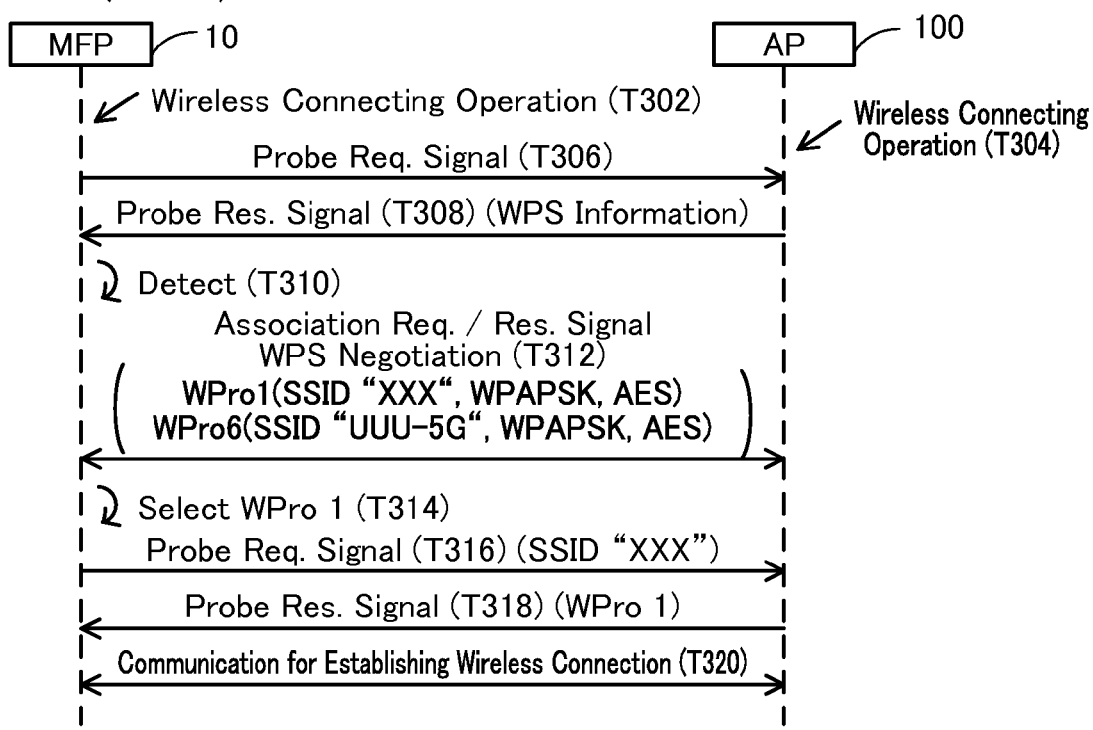

FIG. 8
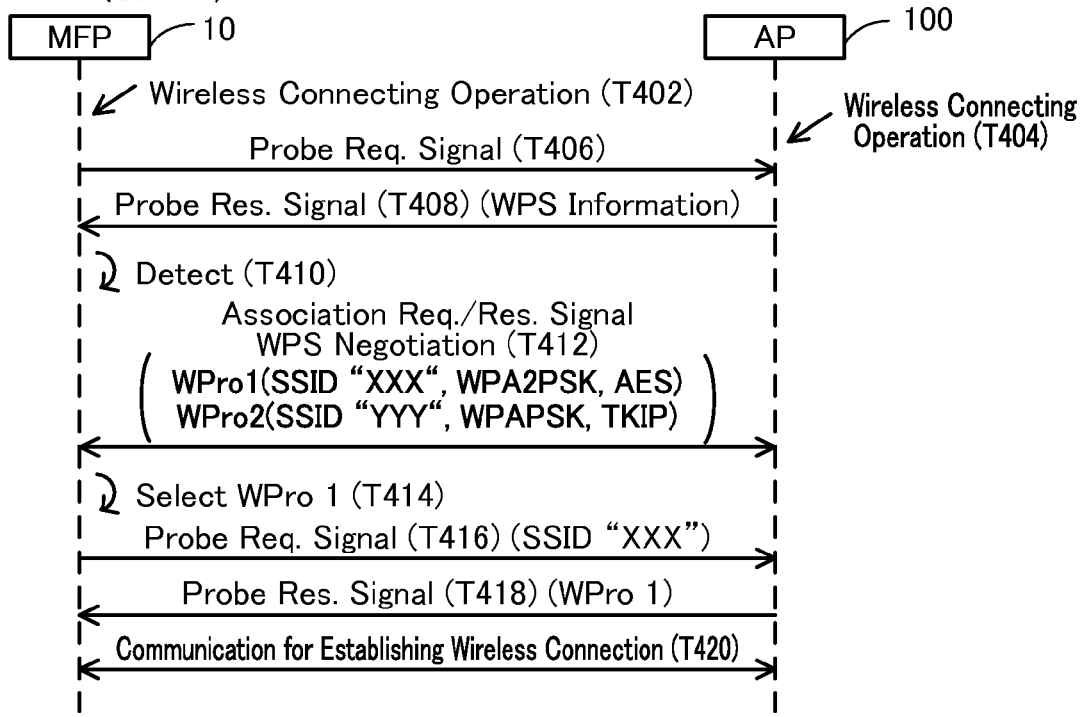
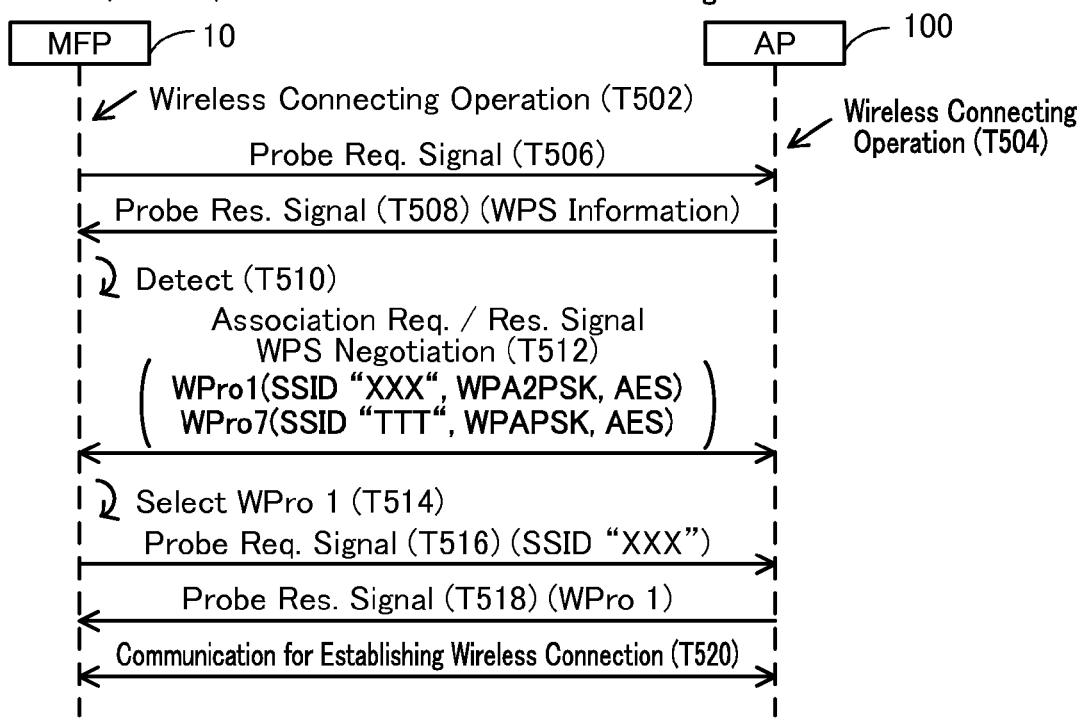

FIG. 9 (Third Embodiment)
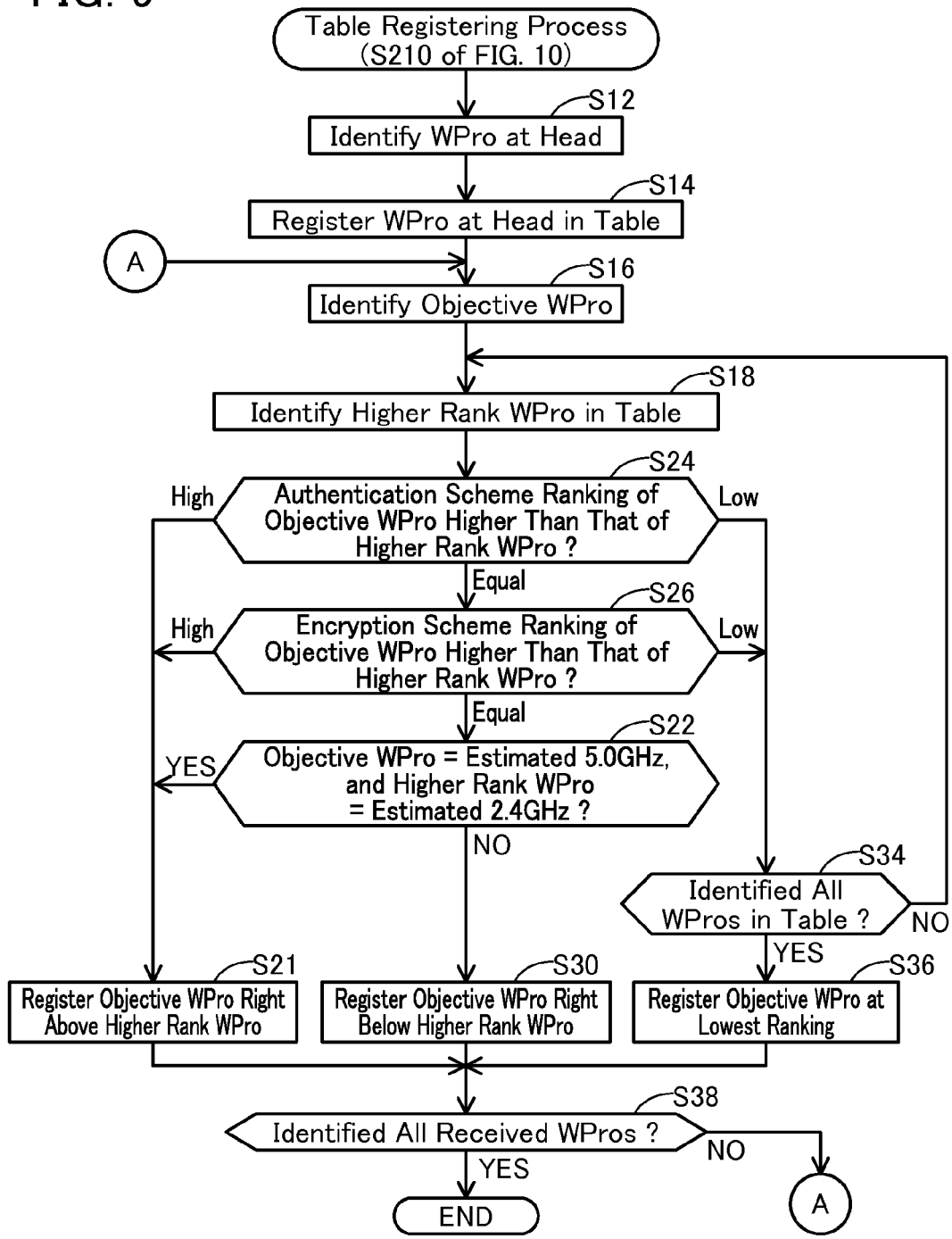

FIG. 10

(Third Embodiment)

42f

| Ranking | SSID | Authentication Scheme | Encryption Scheme | |
|---|---|---|---|---|
| 1 | CCC | WPA2PSK | AES | ← Estimated 2.4GHz WPro |
| 2 | BBB-5G | WPAPSK | AES | ← Estimated 5.0GHz WPro |

42g

| Ranking | SSID | Authentication Scheme | Encryption Scheme | |
|---|---|---|---|---|
| 1 | BBB-5G | WPAPSK | AES | ← Estimated 5.0GHz WPro |
| 2 | AAA | WPAPSK | AES | ← Estimated 2.4GHz WPro |

FIG. 11

(Fourth Embodiment)

42g

| Ranking | SSID | Authentication Scheme | Encryption Scheme | |
|---|---|---|---|---|
| 1 | BBB-5G | WPAPSK | AES | ← Estimated 5.0GHz WPro |
| 2 | AAA | WPAPSK | AES | ← Estimated 2.4GHz WPro |

- Field Intensity of 5.0GHz < Threshold Th and
  Field Intensity of 5.0GHz < Field Intensity of 2.4GHz 42h

| Ranking | SSID | Authentication Scheme | Encryption Scheme | |
|---|---|---|---|---|
| 1 | AAA | WPAPSK | AES | ← Estimated 2.4GHz WPro |
| 2 | BBB-5G | WPAPSK | AES | ← Estimated 5.0GHz WPro |

FIG. 12
(Fourth Embodiment)
(Case G)    Threshold Th > Field Intensity of 5.0GHz
            Field Intensity of 2.4GHz > Field Intensity of 5.0GHz
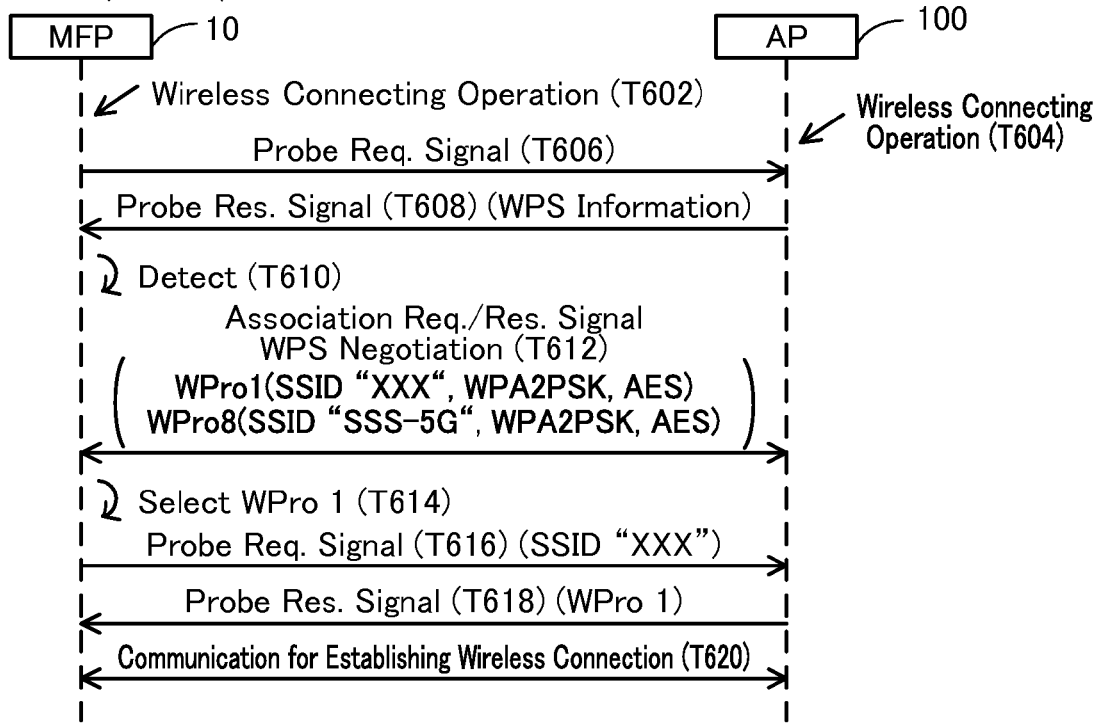
(Case H)    Threshold Th > Field Intensity of 5.0GHz ≥ Field Intensity of 2.4GHz
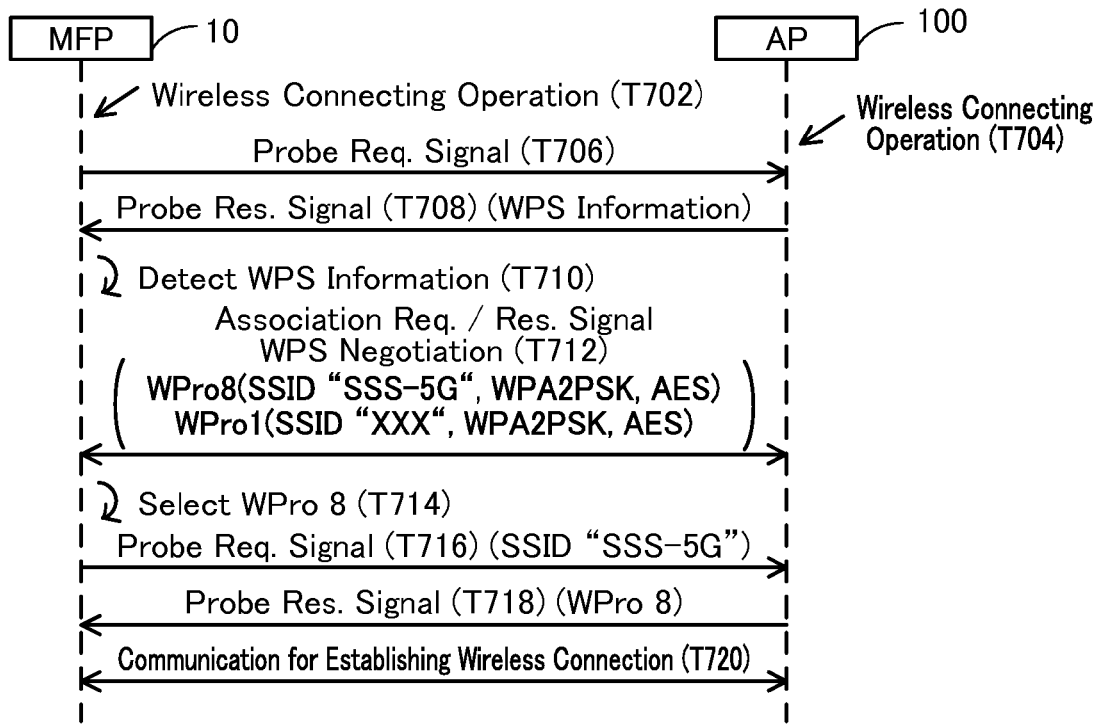

COMMUNICATION APPARATUS

CROSS-REFERENCE TO RELATED APPLICATIONS

This application claims priority to Japanese Patent Application No. 2014-139646, filed on Jul. 7, 2014, the contents of which are hereby incorporated by reference into the present application.

TECHNICAL FIELD

The present specification discloses a communication apparatus for establishing a wireless connection with an access point.

DESCRIPTION OF RELATED ART

An access point capable of simultaneously forming a plurality of wireless LANs (abbreviation of Local Area Network) having different security levels, and a station participating with any of the plurality of wireless LANs, is known.

SUMMARY

In the above technique, not much consideration has been given to the method for determining the wireless LAN to which the station is to be joined. In the present specification, a technique is disclosed which may allow a communication apparatus to appropriately select a wireless network to be joined in a situation where a plurality of wireless networks are formed by an access point.

One aspect disclosed in the present specification may be a communication apparatus comprising: a processor; and a memory storing computer-readable instructions therein, the computer-readable instructions, when executed by the processor, causing the communication apparatus to perform: receiving a first wireless profile and a second wireless profile from an access point after a wireless connecting operation for establishing a wireless connection with the access point in accordance with a predetermined wireless connection scheme has been performed by a user, the first wireless profile being used in a first wireless network formed by the access point, and the second wireless profile being used in a second wireless network formed by the access point; selecting a particular wireless profile from among the first wireless profile and the second wireless profile, the particular wireless profile being used in a wireless network having a relatively high security among the first wireless network and the second wireless network; and trying to establish the wireless connection with the access point using the particular wireless profile, wherein the particular wireless connection scheme is a scheme for establishing the wireless connection with the access point without an identifier for authentication for establishing the wireless connection being inputted by the user to any of the communication apparatus and the access point.

Moreover, a control method, a computer program, and a computer-readable recording medium that stores the computer program, all for realizing the communication apparatus, are also novel and useful.

BRIEF DESCRIPTION OF THE DRAWINGS

FIG. 5 shows a sequence view of cases A and B;

FIG. 6 shows a sequence view of cases C and D;

FIG. 8 shows a sequence view of cases E and F;

FIG. 9 shows a flowchart of a table registering process of a third embodiment;

FIG. 10 shows an example of tables of the third embodiment;

FIG. 11 shows an example of tables of the fourth embodiment; and

FIG. 12 shows a sequence view of cases G and H.

EMBODIMENTS

Figure 1:
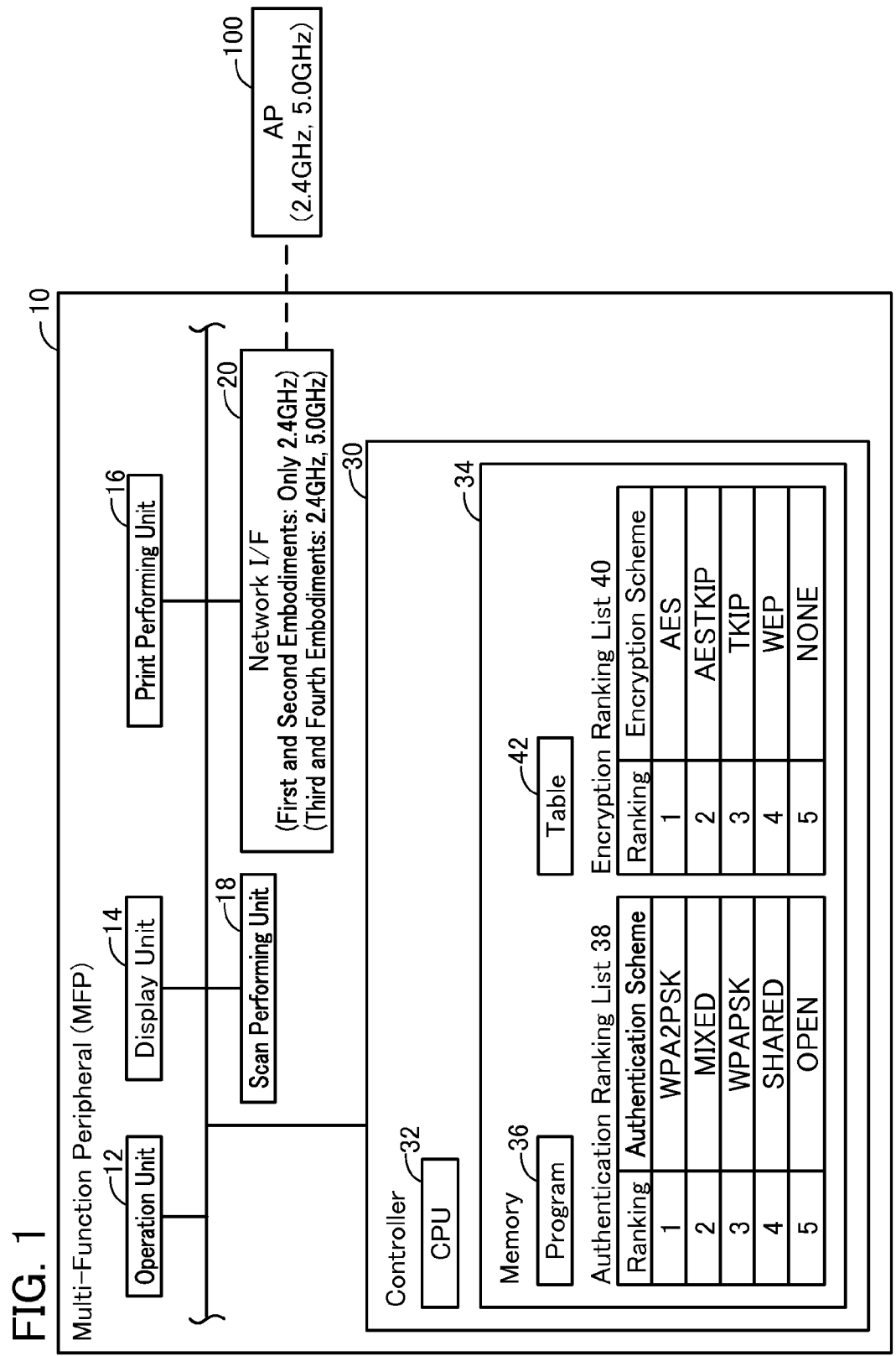
FIG. 1 shows the configuration of a multi-function peripheral.

First Embodiment (Configuration of Multi-Function Peripheral 10; FIG. 1)

A multi-function peripheral 10 (called "MFP (abbreviation of Multi-Function Peripheral)" below) 10 is a peripheral apparatus configured to execute multiple functions including a print function and a scan function (i.e., a peripheral apparatus of a terminal device, or the like, not shown). The MFP 10 comprises an operation unit 12, a display unit 14, a print performing unit 16, a scan performing unit 18, a network interface 20, and a controller 30. Below, an interface is referred to as "I/F".

The operation unit 12 comprises a plurality of keys. A user can input various instructions to the MFP 10 by operating the operation unit 12. The display unit 14 is a display for showing various information. The print performing unit 16 is an ink jet method, laser method, etc. printing mechanism. The scan performing unit 18 is a CCD, CIS, etc. scanning mechanism.

The network I/F 20 is an interface for executing a wireless communication of the Wi-Fi scheme. The Wi-Fi scheme is a wireless communication scheme in accordance with, e.g., IEEE (abbreviation of The Institute of Electrical and Electronics Engineers, Inc.) standard 802.11 or standards conforming thereto (e.g., 802.11a, 11b, 11g, 11n, etc.).

More specifically, the network I/F 20 supports the WPS (abbreviation of Wi-Fi Protected Setup) scheme formulated by the Wi-Fi Alliance. The WPS scheme is called an automatic wireless connection scheme or a simple wireless connection scheme, and is a scheme for automatically establishing a wireless connection between a pair of apparatuses even if information for establishing the wireless connection (e.g., password, authentication scheme, encryption scheme) is not input by the user to either of the pair of apparatuses. In particular, the network I/F 20 supports a PBC (abbreviation of Push-Button Configuration) method of the WPS scheme. The PBC scheme is a scheme for establishing a wireless connection between a pair of apparatuses in the case where a wireless connecting operation (e.g., an operation of pushing a button) is executed by the user on each of the pair of apparatuses even if the information for establishing the wireless connection is not input by the user to either of the pair of apparatuses.

The network I/F 20 is configured to execute a wireless communication using a carrier wave having a frequency of 2.4 GHz band, but is not configured to execute a wireless communication using a carrier wave having another frequency (e.g., 5.0 GHz band).

The controller 30 comprises a CPU 32 and a memory 34. The CPU 32 is a processor which performs various processes in accordance with a program 36 stored in the memory 34. The memory 34 is configured by a RAM, ROM, etc. The memory 34 stores in advance not only the program 36, but also an authentication ranking list 38 and an encryption ranking list 40. The memory 34, further, can also store a table 42 formed by the process of FIG. 3, to be described.

A plurality of authentication schemes is described in order of descending security level in the authentication ranking list 38. The plurality of authentication schemes includes WPA2PSK (abbreviation of Wi-Fi Protected Access 2 Pre-Shared Key), MIXED, WPAPSK (abbreviation of Wi-Fi Protected Access Pre-Shared Key), SHARED (abbreviation of Shared Key), and OPEN (abbreviation of Open System). In general, WPA2PSK and WPAPSK, which conform to WPA (abbreviation of Wi-Fi Protected Access), have a comparatively high security level, and therefore are described at a comparatively higher rank. Since MIXED is an authentication scheme selectively using WPA2PSK and WPAPSK, MIXED is described at a rank between WPA2PSK and WPAPSK. In general, SHARED and OPEN, which do not use the WPA, have a comparatively low security level, and therefore are described at a comparatively lower rank. Further, SHARED has a higher security level than OPEN, and therefore is described at a higher rank than OPEN.

A plurality of encryption schemes is described in the encryption ranking list 40 in the order of descending security level. The plurality of encryption schemes includes AES (abbreviation of Advanced Encryption Standard), AESTKIP (abbreviation of AES Temporal Key Integrity Protocol), TKIP, WEP (abbreviation of Wired Equivalent Privacy), and NONE. In general, the security level of AES is highest, and the security level decreases in the sequence TKIP, WEP, NONE. Since AESTKIP is an encryption scheme selectively using AES and TKIP, is described at a ranking between AES and TKIP.

The table 42 is a list in which one or more wireless profiles (called "WPro (abbreviation of Wireless Profile)" below) received from an access point (called "AP (abbreviation of Access Point)" below) 100 are registered. Each of the one or more WPros includes an SSID (abbreviation of Service Set Identifier), authentication scheme, and encryption scheme, these being wireless setting information used in a wireless network which can be formed by the AP 100. The manner of registering the WPros in the table 42 will be described later.

(Configuration of AP 100)

The AP 100 is a normal AP called a wireless access point, wireless LAN router, etc. The AP 100 comprises physically one interface (not shown), but is configured to execute a wireless communication using a carrier wave having a frequency of 2.4 GHz band and a wireless communication using a carrier wave having a frequency of 5.0 GHz band. Only one MAC address is assigned to the interface.

The AP 100 is capable of simultaneously forming a wireless network in which the carrier wave having the frequency of 2.4 GHz band is used, and a wireless network in which the carrier wave having the frequency of 5.0 GHz band is used. Below, the former wireless network and the latter wireless network are called "2.4 GHz wireless network" and "5.0 GHz wireless network", respectively. The AP 100 stores a WPro (called "WPro (2.4 GHz)" below) used in the 2.4 GHz wireless network, and a WPro (called "WPro (5.0 GHz)" below) used in the 5.0 GHz wireless network. The AP 100 further stores a password (i.e., a password corresponding to WPro (2.4 GHz)) used in the 2.4 GHz wireless network, and a password (i.e., a password corresponding to WPro (5.0 GHz)) used in the 5.0 GHz wireless network. Moreover, in the case of storing the WPro (2.4 GHz) and the WPro (5.0 GHz), the AP 100 may store these two WPros as the same WPro. However, in this case, the password corresponding to the WPro (2.4 GHz) and the password corresponding to the WPro (5.0 GHz) are different. Further, the AP 100 can form two or more 2.4 GHz wireless networks, and can form two or more 5.0 GHz wireless networks. That is, the AP 100 can simultaneously three or more wireless networks.

Figure 2:
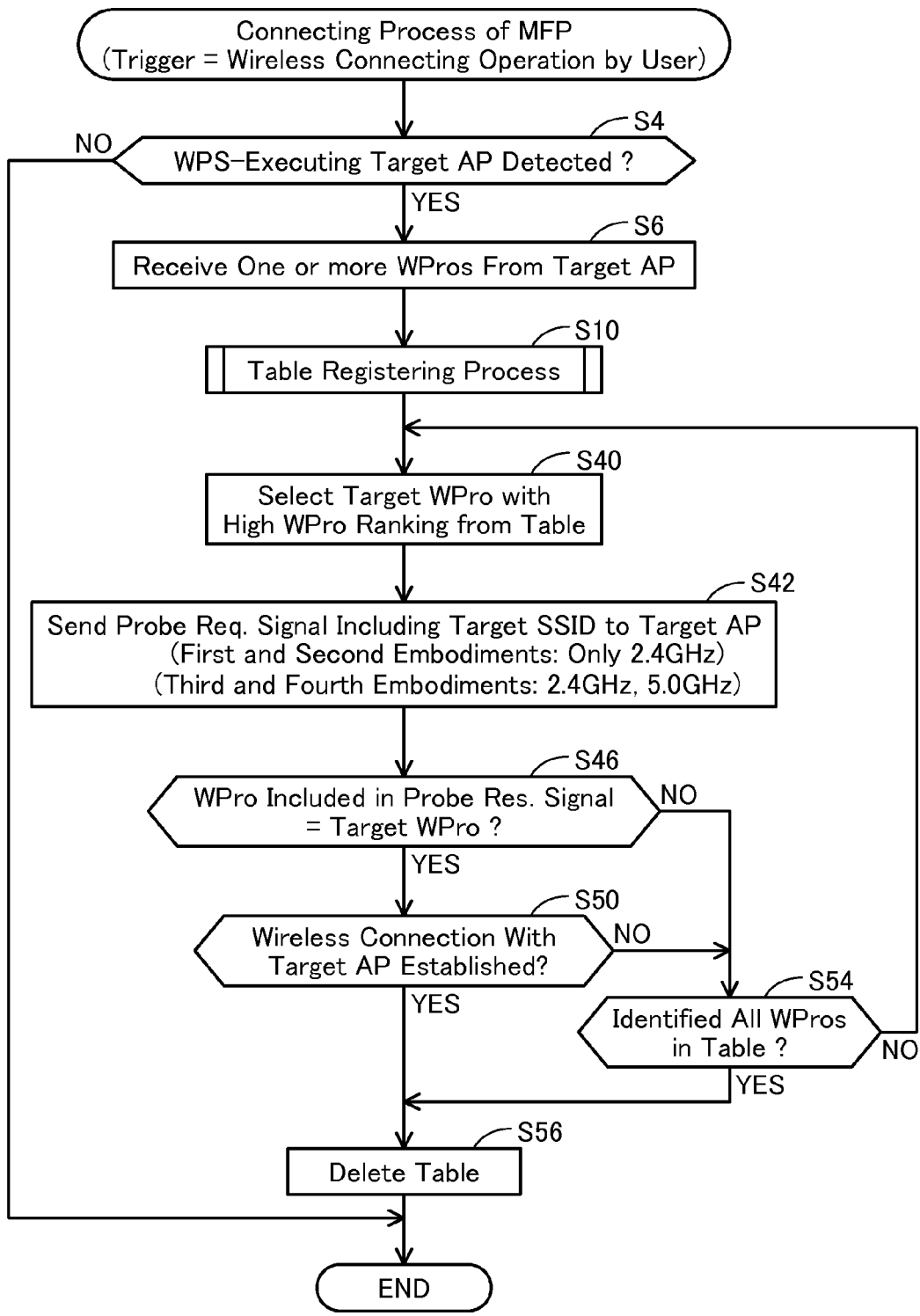
FIG. 2 shows a flowchart of a connecting process.

(Connecting Process of MFP 10; FIG. 2)

Next, the contents of a connecting process executed by the CPU 32 of the MFP 10 will be described with reference to FIG. 2. The process of FIG. 2 starts with, as a trigger, the user executing a wireless connecting operation for establishing a wireless connection with the AP 100. The wireless connecting operation is executed in the operation unit 12 of the MFP 10, and corresponds to a push button operation of the PBC scheme. Moreover, as described above, since the MFP 10 is not configured to execute a wireless communication using a carrier wave having a frequency other than the 2.4 GHz band, all wireless communication described below is executed using the carrier wave having the frequency of 2.4 GHz band.

In S4, the CPU 32 judges whether an AP to which the user executed the wireless connecting operation (e.g., the AP 100, called "target AP" below) has been detected. Specifically, the CPU 32 sends a Probe Request signal that does not specify a destination. In case of receiving the Probe Request signal, the target AP sends, to the MFP 10, a Probe Response signal which includes WPS information indicating that the wireless connecting operation has been executed to the target AP. In case of receiving the Probe Response signal including the WPS information from the target AP, the CPU 32 judges YES in S4, and proceeds to S6. On the other hand, in a situation where the wireless connecting operation has been executed to the MFP 10, but a wireless connecting operation has not executed to any AP, the CPU 32 may receive a Probe Response signal from an AP (e.g., the AP 100) present in the vicinity of the MFP 10, but WPS information is not included in this Probe Response signal. In this case, since a Probe Response signal including WPS information has not been received, the CPU 32 judges NO in S4, and ends the connecting process of FIG. 2. Moreover, below, Request and Response are described as "Req." and "Res.", respectively.

In S6, the CPU 32 receives one or more WPros from the target AP. Specifically, the CPU 32 sends an Association Req. signal to the target AP, and receives an Association Res. signal from the target AP. The CPU 32 further executes a WPS Negotiation with the target AP. Thereby, the CPU 32 receives, from the target AP, a packet in which is described the one or more WPros, and the one or more passwords corresponding to the one or more WPros, which are stored in the target AP. The packet may be one packet, or may be divided into a plurality of packets. Moreover, as described above, the MFP 10 is not configured to execute a wireless communication using the carrier wave having the frequency of 5.0 GHz band, but the packet may include a WPro (5.0 GHz) used in the 5.0 GHz wireless network formed by the target AP. That is, the MFP 10 may receive, from the target AP, the above packet including the WPro (5.0 GHz) by using the carrier wave having the frequency of 2.4 GHz band. Next, in S10, the CPU 32 executes a table registering process.

Figure 3:
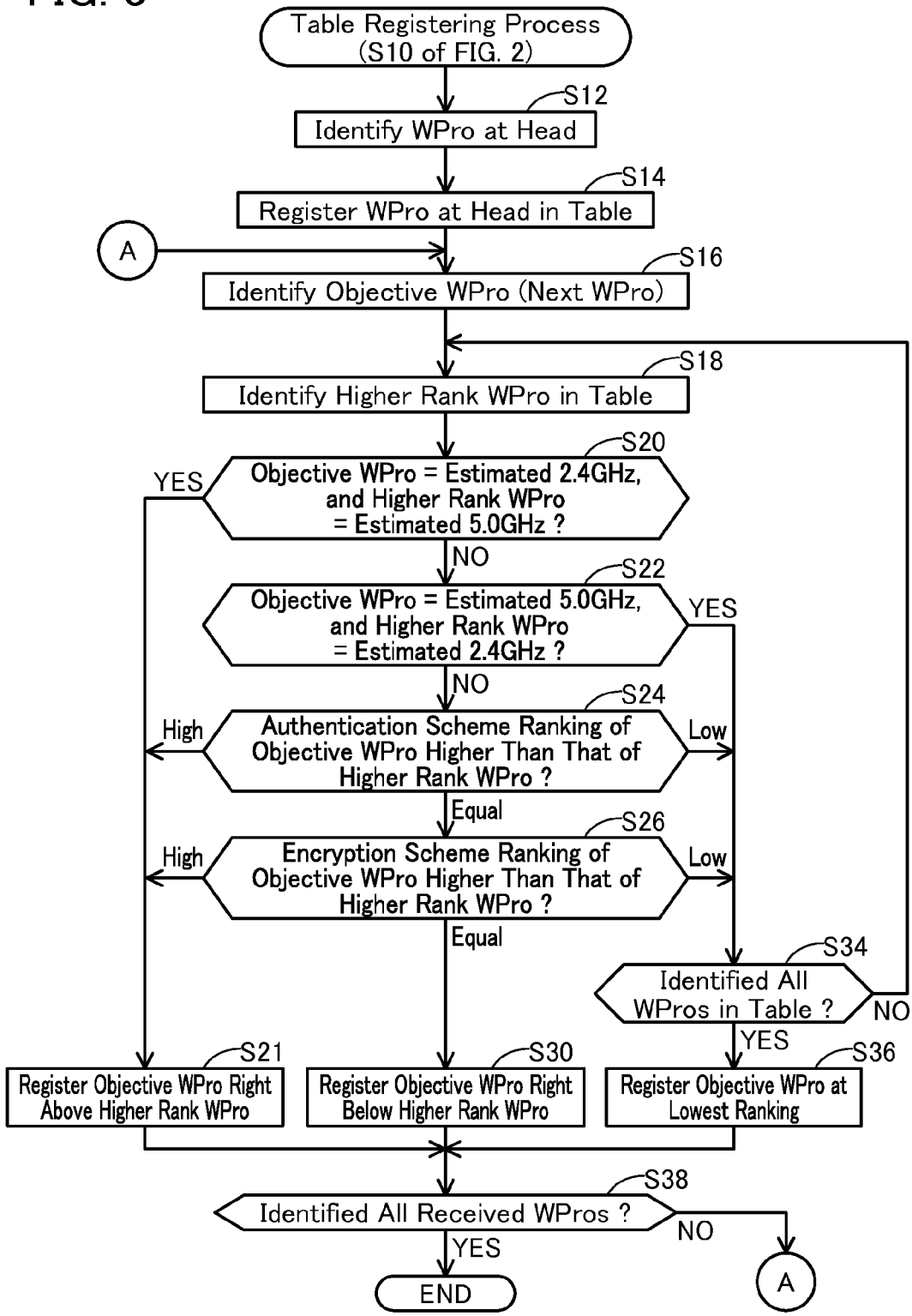
FIG. 3 shows a flowchart of a table registering process.

(Table Registering Process; FIG. 3)

Next, the contents of the table registering process executed in S10 of FIG. 2 will be described with reference to FIG. 3. The CPU 32 generates the table 42 in the memory 34, and executes the processes from S12 onward. In S12, the CPU 32 identifies one WPro, which is described at the head of the packet, from among the one or more WPros received in S6 of FIG. 2. That is, the CPU 32 identifies the one WPro which was received first from among the one or more WPros. In S14, the CPU 32 registers the WPro identified in S12 in the table 42. In this situation, only one WPro is registered in the table 42. Moreover, when the WPro is to be registered in the table 42, the password corresponding to the WPro is also registered in the table 42. However, below, a description relating to registering the password in the table 42 is omitted.

In S16, the CPU 32 identifies, as an objective WPro, a WPro described subsequent to the WPro at the head in the packet. That is, the CPU 32 identifies one WPro which was received second. Moreover, in the process of S16 from the second time onward, the CPU 32 identifies, as the objective WPro, a WPro described subsequent to the previously identified WPro. Further, although not shown, in the case where only one WPro is received from the target AP, the CPU 32 cannot identify an objective WPro, and consequently ends the process of FIG. 3 without executing the processes from S16 onward.

In S18, the CPU 32 identifies, as a higher rank WPro, the highest rank WPro, from among the one or more WPros registered in the table 42. In S20, the CPU 32 judges whether the objective WPro identified in S16 is an estimated 2.4 GHz WPro, and the higher rank WPro identified in S18 is an estimated 5.0 GHz WPro. The estimated 2.4 GHz WPro is a WPro estimated to be a WPro (2.4 GHz). The estimated 5.0 GHz WPro is a WPro estimated to be a WPro (5.0 GHz). Specifically, in the case where the SSID included in the objective WPro includes a character string "-5G", the CPU 32 first judges that the objective WPro is an estimated 5.0 GHz WPro. In the case where the SSID included in the objective WPro does not include the character string "-5G", the CPU 32 judges that the objective WPro is an estimated 2.4 GHz WPro. Similarly, the CPU 32 judges whether the higher rank WPro is an estimated 2.4 GHz WPro or is an estimated 5.0 GHz WPro. In the case where the objective WPro is an estimated 2.4 GHz WPro and the higher rank WPro is an estimated 5.0 GHz WPro, the CPU 32 judges YES in S20 and, in S21, registers the objective WPro right above the higher rank WPro in the table 42. That is, the estimated 2.4 GHz WPro is registered at a higher rank than the estimated 5.0 GHz WPro. When S21 ends, the CPU 32 proceeds to S38. On the other hand, in the case where the objective WPro is an estimated 5.0 GHz WPro, or the higher rank WPro is an estimated 2.4 GHz WPro, the CPU 32 judges NO in S20, and proceeds to S22.

In S22, the CPU 32 judges whether the objective WPro is an estimated 5.0 GHz WPro, and the higher rank WPro is an estimated 2.4 GHz WPro. In the case where the objective WPro is an estimated 5.0 GHz WPro, and the higher rank WPro is an estimated 2.4 GHz WPro, the CPU 32 judges YES in S22, and proceeds to S34. On the other hand, in the case where both the objective WPro and the higher rank WPro are estimated 2.4 GHz WPros, or in the case where both the objective WPro and the higher rank WPro are estimated 5.0 GHz WPros, the CPU 32 judges NO in S22, and proceeds to S24.

Moreover, the estimations in S20, S22 may not be accurate. That is, it is possible that the estimated 5.0 GHz WPro is actually a WPro (2.4 GHz), and the estimated 2.4 GHz WPro is actually a WPro (5.0 GHz). If the above estimations were completely accurate, the CPU 32 would not need to register the objective WPro in the table 42 in the case of judging that the objective WPro is an estimated 5.0 GHz WPro. This is because, as described above, the MFP 10 is not capable of establishing a wireless connection with the target AP using the WPro (5.0 GHz) due to not being configured to execute a wireless communication using the carrier wave having the frequency other than 2.4 GHz band. However, in the present embodiment, despite the objective WPro being the estimated 5.0 GHz WPro, it is possible that the objective WPro is actually a WPro (2.4 GHz), and consequently the objective WPro is registered in the table 42.

In S24, the CPU 32 judges whether an objective authentication scheme ranking included in the objective WPro is higher than a higher rank authentication scheme ranking included in the higher rank WPro by using the authentication ranking list 38 in the memory 34. In the case where the objective authentication scheme ranking is higher than the higher rank authentication scheme ranking, in S21 the CPU 32 registers the objective WPro right above the higher rank WPro. That is, the objective WPro which includes the authentication scheme having a higher security level is registered at the higher rank of the table 42. The CPU 32 proceeds to S26 in the case where the objective authentication scheme ranking is equal to the higher rank authentication scheme ranking, and proceeds to S34 in the case where the objective authentication scheme ranking is lower than the higher rank authentication scheme ranking.

In S26, the CPU 32 judges whether an objective encryption scheme ranking included in the objective WPro is higher than a higher rank encryption scheme ranking included in the higher rank WPro by using the encryption ranking list 40 in the memory 34. In the case where the objective encryption scheme ranking is higher than the higher rank encryption scheme ranking, in S21 the CPU 32 registers the objective WPro right above the higher rank WPro. That is, the objective WPro which includes the encryption scheme having a higher security level is registered at the higher rank of the table 42. The CPU 32 proceeds to S30 in the case where the objective encryption scheme ranking is equal to the higher rank encryption scheme ranking, and proceeds to S34 in the case where the objective encryption scheme ranking is lower than the higher rank encryption scheme ranking.

In S30, the CPU 32 registers the objective WPro right below the higher rank WPro. Here, in S16, the WPros are identified in the order they are received. Consequently, the objective WPro is received later than the higher rank WPro already registered in the table 42. Therefore, the objective WPro which was received later is registered at a lower ranking in the table 42.

In S34, the CPU 32 judges whether all the WPros in the table 42 have been identified in S18. In the case of judging that not all the WPros have been identified (NO in S34), in S18 the CPU 32 identifies, as a higher rank WPro, the highest rank WPro that has not yet been identified from the table 42 (i.e., the WPro right below the WPro identified in the previous time of S18). On the other hand, in the case of judging that all the WPros have been identified from the table 42 (YES in S34), in S36 the CPU 32 registers the objective WPro at the lowest rank in the table 42.

In S38, the CPU 32 judges whether all the one or more WPros received in S6 of FIG. 2 have been identified in S12 and S16. In the case of judging that not all the one or more WPros have been identified (NO in S38), in S16 the CPU 32 identifies, as a new objective WPro, the one WPro received subsequent to the previous objective WPro from among the one or more WPros. On the other hand, in the case of judging that all the one or more WPros have been identified (YES in S38), the CPU 32 ends the table registering process of FIG. 3.

Figure 4:
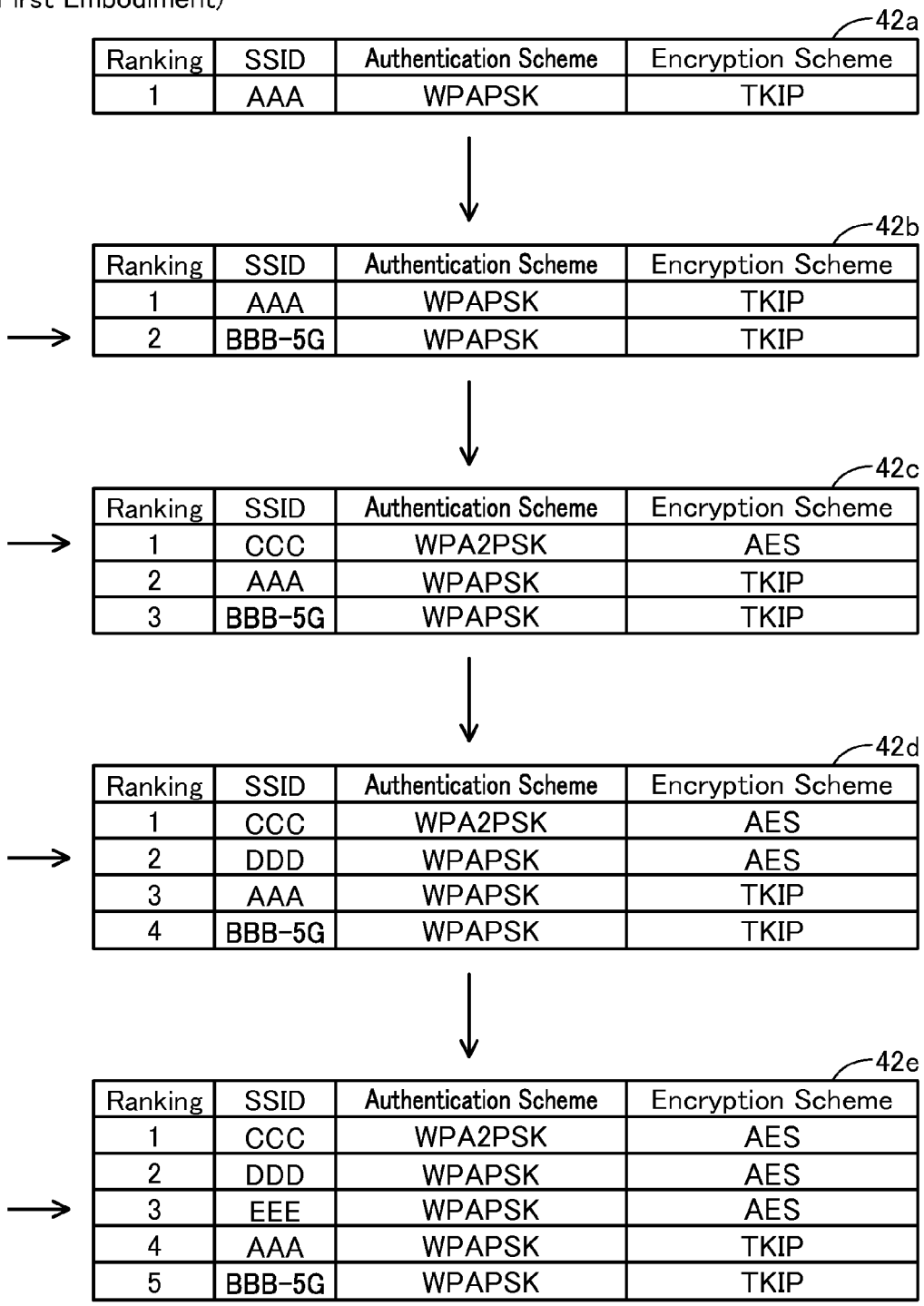
FIG. 4 shows how wireless profiles are registered in the table.

(Example of WPros Registered in Table 42; FIG. 4)

Next, an example of the WPros registered in the table 42 by the table registering process of FIG. 3 will be described with reference to FIG. 4. In the example of FIG. 4, a situation is assumed in which five WPros are received from the target AP in S6 of FIG. 2.

First, the CPU 32 identifies, as the head WPro, a first WPro which includes an SSID "AAA", the authentication scheme "WPAPSK", and the encryption scheme "TKIP" (S12 of FIG. 3), and registers the first WPro (S14, see table 42a).

Next, the CPU 32 identifies, as the objective WPro, a second WPro which includes an SSID "BBB-5G", the authentication scheme "WPAPSK", and the encryption scheme "TKIP" (S16), and identifies the first WPro as a higher rank WPro (S18). Since the SSID "BBB-5G" included in the second WPro includes the character string "-5G", the CPU 32 judges that the objective WPro is an estimated 5.0 GHz WPro and, since the SSID "AAA" included in the first WPro does not include the character string "-5G", the CPU 32 judges that the higher rank WPro is an estimated 2.4 GHz WPro (NO in S20, YES in S22). Next, the CPU 32 judges that all the WPros have been identified from the table 42 (YES in S34), and registers the second WPro in the lowest ranking of the table 42a (S36, see table 42b).

Next, the CPU 32 identifies, as the objective WPro, a third WPro which includes an SSID "CCC", the authentication scheme "WPA2PSK", and the encryption scheme "AES" (S16), and identifies, as the higher rank WPro, the first WPro having the highest rank within the table 42b (S18). Since the CPU 32 judges that the first WPro is an estimated 2.4 GHz WPro, and the SSID "CCC" included in the third WPro does not include the character string "-5G", the CPU 32 judges that the third WPro is an estimated 2.4 GHz WPro (NO in S20, NO in S22). Next, the CPU 32 judges that the ranking of the authentication scheme "WPA2PSK" included in the third WPro is higher than the ranking of the authentication scheme "WPAPSK" included in the first WPro (see FIG. 1, high in S24), and registers the third WPro right above the first WPro (S21, see table 42c).

Next, the CPU 32 identifies, as the objective WPro, a fourth WPro which includes an SSID "DDD", the authentication scheme "WPAPSK", and the encryption scheme "AES" (S16), and identifies, as the higher rank WPro, the third WPro having the highest rank within the table 42c (S18). Since the CPU 32 judges that the third WPro is an estimated 2.4 GHz WPro, and the SSID "DDD" included in the fourth WPro does not include the character string "-5G", the CPU 32 judges that the fourth WPro is an estimated 2.4 GHz WPro (NO in S20, NO in S22). Next, the CPU 32 judges that the ranking of the authentication scheme "WPAPSK" included in the fourth WPro is lower than the ranking of the authentication scheme "WPA2PSK" included in the third WPro (see FIG. 1, low in S24), and judges that not all the WPros in the table 42c have been identified (NO in S34). Next, the CPU 32 identifies, as the higher rank WPro, the first WPro, which has the next highest rank within the table 42c (S18). The CPU 32 judges that the first WPro is an estimated 2.4 GHz WPro, and judges that the fourth WPro is an estimated 2.4 GHz WPro (NO in S20, NO in S22). Next, the CPU 32 judges that the ranking of the authentication scheme "WPAPSK" included in the fourth WPro is equal to the ranking of the authentication scheme "WPAPSK" included in the first WPro (see FIG. 1, equal in S24), judges that the ranking of the encryption scheme "AES" included in the fourth WPro is higher than the ranking of the encryption scheme "TKIP" included in the first WPro (see FIG. 1), and registers the fourth WPro right above the first WPro (S21, table 42d).

Next, the CPU 32 identifies a fifth WPro which includes an SSID "EEE", the authentication scheme "WPAPSK", and the encryption scheme "AES as the objective WPro (S16), and identifies, as the higher rank WPro, the third WPro having the highest rank within the table 42d (S18). The CPU 32 judges that the third WPro is an estimated 2.4 GHz WPro. Since the SSID "EEE" included in the fifth WPro does not include the character string "-5G", the CPU 32 judges that the fifth WPro is an estimated 2.4 GHz WPro (NO in S20, NO in S22). Next, the CPU 32 judges that the ranking of the authentication scheme "WPAPSK" included in the fifth WPro is lower than the ranking of the authentication scheme "WPA2PSK" included in the third WPro (see FIG. 1, low in S24), and judges that not all the WPros within the table 42d have been identified (NO in S34). Next, the CPU 32 identifies, as the higher rank WPro, the fourth WPro which has the next highest rank within the table 42d (S18). The CPU 32 judges that the fourth WPro is an estimated 2.4 GHz WPro, and judges that the fifth WPro is an estimated 2.4 GHz WPro (NO in S20, NO in S22). Next, the CPU 32 judges that the ranking of the authentication scheme "WPAPSK" included in the fifth WPro is equal to the ranking of the authentication scheme "WPAPSK" included in the fourth WPro (see FIG. 1, equal in S24), and judges that the ranking of the encryption scheme "AES" included in the fifth WPro is equal to the ranking of the encryption scheme "AES" included in the fourth WPro (see FIG. 1, equal in S26). Consequently, the CPU 32 registers the fifth WPro right below the fourth WPro (S30, table 42e).

(Continuation of Process of FIG. 2)

In S40 of FIG. 2, the CPU 32 selects the WPro with the highest rank in the table 42 as a the target WPro. Moreover, in S40 of a second and subsequent times, the CPU 32 selects the WPro with the next highest rank in the table 42 as the target WPro. In S42, the CPU 32 extracts the SSID included in the target WPro, and sends a Probe Req. signal which includes the SSID to the target AP.

In S46, the CPU 32 judges whether the WPro included in the Probe Res. signal received from the target AP is identical to the target WPro. Specifically, first the CPU 32 judges whether a Probe Res. signal which includes a WPro has been received from the target AP. In the case where a Probe Res. signal has not been received from the target AP, the CPU 32 judges NO in S46, and proceeds to S54. For example, the CPU 32 does not receive a Probe Res. signal from the target AP in the situation below. That is, in the case of selecting a WPro (5.0 GHz) as the target WPro in S40, the CPU 32 sends a Probe Req. signal which includes the SSID within the WPro (5.0 GHz) to the target AP in S42. When receiving the Probe Req. signal by using a carrier wave having a frequency of 2.4 GHz band, the target AP judges whether a WPro (2.4 GHz) which includes an SSID in the Probe Req. signal is being stored and, if the WPro (2.4 GHz) is not being stored, does not send a Probe Res. signal to the MFP 10. In this case, the CPU 32 does not receive a Probe Res. signal from the target AP, and consequently judges NO in S46.

Further, when receiving a Probe Res. signal from the target AP, the CPU judges whether the authentication scheme and the encryption scheme included in the WPro in the Probe Res. signal are each identical to the authentication scheme and the encryption scheme included in the target WPro. In the case where the authentication scheme and the encryption scheme included in the WPro in the Probe Res. signal are each identical to the authentication scheme and the encryption scheme included in the target WPro, the CPU 32 judges YES in S46, and proceeds to S50. On the other hand, in the case where the authentication scheme included in the WPro in the Probe Res. signal is different from the authentication scheme included in the target WPro, or the encryption scheme included in the WPro in the Probe Res. signal is different from the encryption scheme included in the target WPro, the CPU 32 judges NO in S46, and proceeds to S54. For example, in the following situation, the authentication scheme or the encryption scheme included in the WPro in the Probe Res. signal is different from the authentication scheme or the encryption scheme included in the target WPro. That is, in S40 the CPU 32 selects the WPro (5.0 GHz) as the target WPro, and in S42 sends a Probe Req. signal which includes the SSID in the WPro (5.0 GHz) to the target AP. In the case where the target AP is storing the WPro (2.4 GHz) which includes the SSID in the aforementioned Probe Req. signal, the target AP sends a Probe Res. signal which includes the WPro (2.4 GHz) to the MFP 10. In this case, the SSID included in the WPro (2.4 GHz) in the Probe Res. signal is identical to the SSID included in the WPro (5.0 GHz) selected as the target WPro, but the authentication scheme or encryption scheme included in the WPro (2.4 GHz) may not be identical to the authentication scheme or encryption scheme included in the WPro (5.0 GHz). In such a situation, the authentication scheme or encryption scheme included in the WPro in the Probe Res. signal is different from the authentication scheme or encryption scheme included in the target WPro, and consequently the CPU 32 judges NO in S46.

In S50, the CPU 32 judges whether establishment of the wireless connection with the target AP has succeeded. Specifically, the CPU 32 executes communication of various signals with the target AP for establishing the wireless connection in accordance with the WPS scheme, and attempts to establish the wireless connection with the target AP. In particular, the CPU 32 tries to establish the wireless connection with the target AP by using the password registered in the table 42 in association with the target WPro. Here, in the case where the WPro in the Probe Res. signal of S46 and the password have been associated and stored in the target AP, the establishment of the wireless connection with the target AP succeeds, and consequently the CPU 32 judges YES in S50, and proceeds to S56. On the other hand, in the case where the WPro in the Probe Res. signal of S46 and the password have not been associated and stored in the target AP, the establishment of the wireless connection with the target AP fails, and consequently the CPU 32 judges NO in S50, and proceeds to S54. For example, in the following situation, the establishment of the wireless connection with the target AP fails. For example, since the WPro (2.4 GHz) in the Probe Res. signal received in S46, and the WPro (5.0 GHz) selected as the target WPro can be identical, in this case, YES is judged in S46. However, the password corresponding to the WPro (2.4 GHz) and the password corresponding to the WPro (5.0 GHz) are different. Consequently, even if the password registered in the table 42 in association with the WPro (5.0 GHz) is used, the WPro (2.4 GHz) in the Probe Res. signal of S46 and the password are not associated with each other and stored in the target AP, and consequently the establishment of the wireless connection with the target AP fails.

In S54, the CPU 32 judges whether all the WPros in the table 42 have been identified in S40. In case of judging that not all the WPros have been identified (NO in S54), in S40 the CPU 32 identifies, as the target WPro from the table 42, the highest ranking WPro that has not yet been identified. On the other hand, in case of judging that all the WPros have been identified (YES in S54), the CPU 32 proceeds to S56. In S56, the CPU 32 deletes the table 42 from the memory 34, and ends the connecting process of FIG. 2.

(Specific Cases; FIG. 5, FIG. 6)

Next, the contents of specific cases implemented in accordance with the flowcharts of FIG. 2 and FIG. 3 will be described with reference to FIG. 5 and FIG. 6.

(Case A; FIG. 5)

In T2 and T4, the user executes the wireless connecting operation on each of the MFP 10 and the AP 100 (the trigger of the process of FIG. 2).

In T6, the MFP 10 sends the Probe Req. signal to the AP 100 and, in T8, receives the Probe Res. signal which includes the WPS information from the AP 100. In T10, the MFP 10 judges that the AP 100 has been detected (YES in S4).

In T12, the MFP 10 executes the communication of Association Req./Res. signals and the WPS Negotiation with the AP 100. Thereby, the MFP 10 receives two WPros (called WPro1, WPro2 below) from the target AP (S6). The WPro1 includes an SSID "XXX", the authentication scheme "WPA2PSK", and the encryption scheme "AES". The WPro2 includes an SSID "YYY", the authentication scheme "WPAPSK", and the encryption scheme "TKIP". Moreover, the WPro1 and the WPro2 are WPros (2.4 GHz).

The ranking of the authentication scheme "WPA2PSK" included in the WPro1 is higher than the ranking of the authentication scheme "WPAPSK" included in the WPro2 (see the authentication ranking list 38 of FIG. 1). Consequently, the WPro1 is registered at a higher rank than the WPro2 in the table 42 (S10, FIG. 3). As a result, in T14, the MFP 10 selects the WPro1 (S40).

In T16, the MFP 10 sends a Probe Req. signal which includes the SSID "XXX" included in the WPro1 to the AP 100 (S42) and, in T18, receives a Probe Res. signal which includes the WPro1 from the AP 100 (YES in S46). Then, in T20 the MFP 10 tries to establish the wireless connection with the AP 100 by using the password (not shown) registered in the table 42 in association with the WPro1, and establishes the wireless connection with the AP 100 (YES in S50).

The following communication can be executed in a state where the MFP 10 and the AP 100 are belonging to the same wireless network as a result of the above wireless connection being established. For example, by using the wireless network, the MFP 10 can receive an image file via the AP 100 from another apparatus belonging to the wireless network, and execute a print of an image represented by the image file. Further, e.g., the MFP 10 can generate scan data by executing a scan of an original document, and send the scan data to the other apparatus via the AP 100 by using the wireless network.

As described above, the MFP 10 receives the WPro1 and the WPro2 from the AP 100 (T12) after having executed the wireless connecting operation (T2). The MFP 10 selects the WPro1 which includes the authentication scheme "WPS2PSK" having a comparatively high security level from among the WPro1 and the WPro2 (T14). Then, the MFP 10 can establish the wireless connection with the AP 100 by using the WPro1 (T20). Thereby, the MFP 10 can appropriately join a wireless network having a comparatively high security level.

(Case B)

T102 to T112 are the same as T2 to T12 of case A of FIG. 5. However, they differ from case A in that the MFP 10 receives WPro3 and WPro4 instead of the WPro1 and WPro2 from the AP 100 in T112. The WPro3 includes an SSID "ZZZ", the authentication scheme "WPAPSK", and the encryption scheme "AES". The WPro4 includes an SSID "WWW", the authentication scheme "WPAPSK", and the encryption scheme "TKIP". Moreover, the WPro3 and WPro4 are WPros (2.4 GHz).

The ranking of the authentication scheme "WPAPSK" included in the WPro3 is equal to the ranking of the authentication scheme "WPAPSK" included in the WPro4, and the ranking of the encryption scheme "AES" included in the WPro3 is higher than the ranking of the encryption scheme "TKIP" included in the WPro4 (see the lists 38, 40 of FIG. 1). Consequently, the WPro3 is registered at a higher rank than the WPro4 in the table 42 (S10, FIG. 3). As a result, the MFP 10 selects the WPro3 in T114 (S40 of FIG. 2).

In T116, the MFP 10 sends a Probe Req. signal which includes the SSID "ZZZ" included in the WPro3 to the AP 100 (S42 of FIG. 2) and, in T118, receives a Probe Res. signal which includes a WPro that is identical to the WPro3 from the AP 100 (YES in S46). T120 is the same as T20 of case A of FIG. 5.

As described above, in the case where the ranking of the authentication scheme "WPAPSK" included in the WPro3 and the ranking of the authentication scheme "WPAPSK" included in the WPro4 are equal, the MFP 10 selects the WPro3 which includes the encryption scheme "AES" having a comparatively high security level from among the WPro3 and the WPro4 (T114). Then, the MFP 10 can establish a wireless connection with the AP 100 by using the WPro3 (T120). Thereby, the MFP 10 can appropriately join a wireless network having a comparatively high security level.

(Case C; FIG. 6)

T202 to T212 are the same as T2 to T12 of case A of FIG. 5. However, they differ from case A in that the MFP 10 receives a WPro5 instead of the WPro2 from the AP 100 in T212. The WPro5 includes an SSID "VVV", the authentication scheme "WPA2PSK", and the encryption scheme "AES". The WPro1 is received first, and the WPro5 is received thereafter. Moreover, the WPro5 is a WPro (2.4 GHz).

The ranking of the authentication scheme "WPA2PSK" included in the WPro1 is equal to the ranking of the authentication scheme "WPA2PSK" included in the WPro5, and the ranking of the encryption scheme "AES" included in the WPro1 is equal to the ranking of the encryption scheme "AES" included in the WPro4 (see tables 38, 40 of FIG. 1). Further, the WPro1 is received prior to the WPro5. Consequently, the WPro1 is registered at a higher rank than the WPro5 in the table 42 (S10, FIG. 3). As a result, the MFP 10 selects the WPro1 in T214 (S40 of FIG. 2). T216 to T220 are the same as T16 to T20 of case A of FIG. 5.

As described above, in the case where the ranking of the authentication scheme "WPA2PSK" included in the WPro1 and the ranking of the authentication scheme "WPA2PSK" included in the WPro5 are equal, and the ranking of the encryption scheme "AES" included in the WPro1 and the ranking of the encryption scheme "AES" included in the WPro5 are equal, the MFP 10 selects the WPro1 received first from among the WPro1 and the WPro5 (T214). Then, the MFP 10 can establish the wireless connection with the AP 100 by using the WPro1 (T220).

(Case D)

T302 to T312 are the same as T2 to T12 of case A of FIG. 5. However, they differ from case A in that the MFP 10 receives a WPro6 instead of the WPro2 from the AP 100 in T312. The WPro6 is a WPro (5.0 GHz), and includes an SSID "UUU-5G", the authentication scheme "WPAPSK", and the encryption scheme "AES".

Since the SSID "XXX" included in the WPro1 does not include the character string "-5G", the MFP 10 judges that the WPro1 is an estimated 2.4 GHz WPro. Since the SSID "UUU-5G" included in the WPro6 includes the character string "-5G", the MFP 10 judges that the WPro6 is an estimated 5.0 GHz WPro (see S20, S22 of FIG. 3). Consequently, the WPro1 is registered at a higher rank than the WPro6 in the table 42 (S10, FIG. 3). As a result, the MFP 10 selects the WPro1 in T314 (S40 of FIG. 2). T316 to T320 are the same as T16 to T20 of case A of FIG. 5.

As described above, the MFP 10 selects the WPro1, which is a WPro (2.4 GHz), and does not select the WPro6, which is a WPro (5.0 GHz), from among the WPro1 and the WPro6 (T314). As a result, the MFP 10 can appropriately join a wireless network which utilizes a frequency band which the MFP 10 is capable of using.

Moreover, in case D, the WPro1, which is an estimated 2.4 GHz WPro, is selected regardless of the ranking of the authentication schemes and the encryption schemes included in the WPro1 and the WPro6. A case is assumed, as a case different from case D, in which e.g., the MFP 10 receives one estimated 5.0 GHz WPro and two estimated 2.4 GHz WPros. Of the three WPros, the estimated 5.0 GHz WPro includes the highest security level authentication scheme. Even in this case, the MFP 10 selects the WPro which includes the higher security level authentication scheme from among the two estimated 2.4 GHz WPros and does not preferentially select the estimated 5.0 GHz WPro. That is, the MFP 10 selects a WPro having a comparatively high security level rather than necessarily selecting the highest security level WPro.

(Correspondence Relationship)

The MFP 10 and the WPS scheme are examples of "communication apparatus" and "predetermined wireless connection scheme", respectively. The process of S6 of FIG. 2 is an example of a process executed by "receiving". The process of S10 and the process of S40 of FIG. 2, and the table registering process of FIG. 3 are examples of processes executed by "selecting". The processes of S42 to S50 are examples of processes executed by "trying".

In case A of FIG. 5, the WPro1 is an example of "first wireless profile" and "particular wireless profile". In case A, the WPro2 is an example of "second wireless profile". In case A, the authentication schemes "WPA2PSK" and "WPAPSK" are examples of "first authentication scheme" and "second authentication scheme", respectively.

In case B of FIG. 5, the WPro3 is an example of "first wireless profile" and "particular wireless profile". In case B, the WPro4 is an example of "second wireless profile". In case B of FIG. 5, the authentication scheme "WPAPSK" is an example of "first authentication scheme" and "second authentication scheme". In case B, the encryption schemes "AES" and "TKIP" are examples of "first encryption scheme" and "second encryption scheme", respectively.

In case C of FIG. 6, the WPro1 is an example of "first wireless profile" and "particular wireless profile". In case C, the WPro5 is an example of "second wireless profile". In case C, the authentication scheme "WPA2PSK" is an example of "first authentication scheme" and "second authentication scheme". In case C, the encryption scheme "AES" is an example of "first encryption scheme" and "second encryption scheme".

In case D of FIG. 6, the WPro1 is an example of "first wireless profile" and "particular wireless profile". In case D of FIG. 6, the WPro6 is an example of "second wireless profile". In case D of FIG. 6, 2.4 GHz band and 5.0 GHz band are examples of "first frequency" and "second frequency", respectively.

Figure 7:
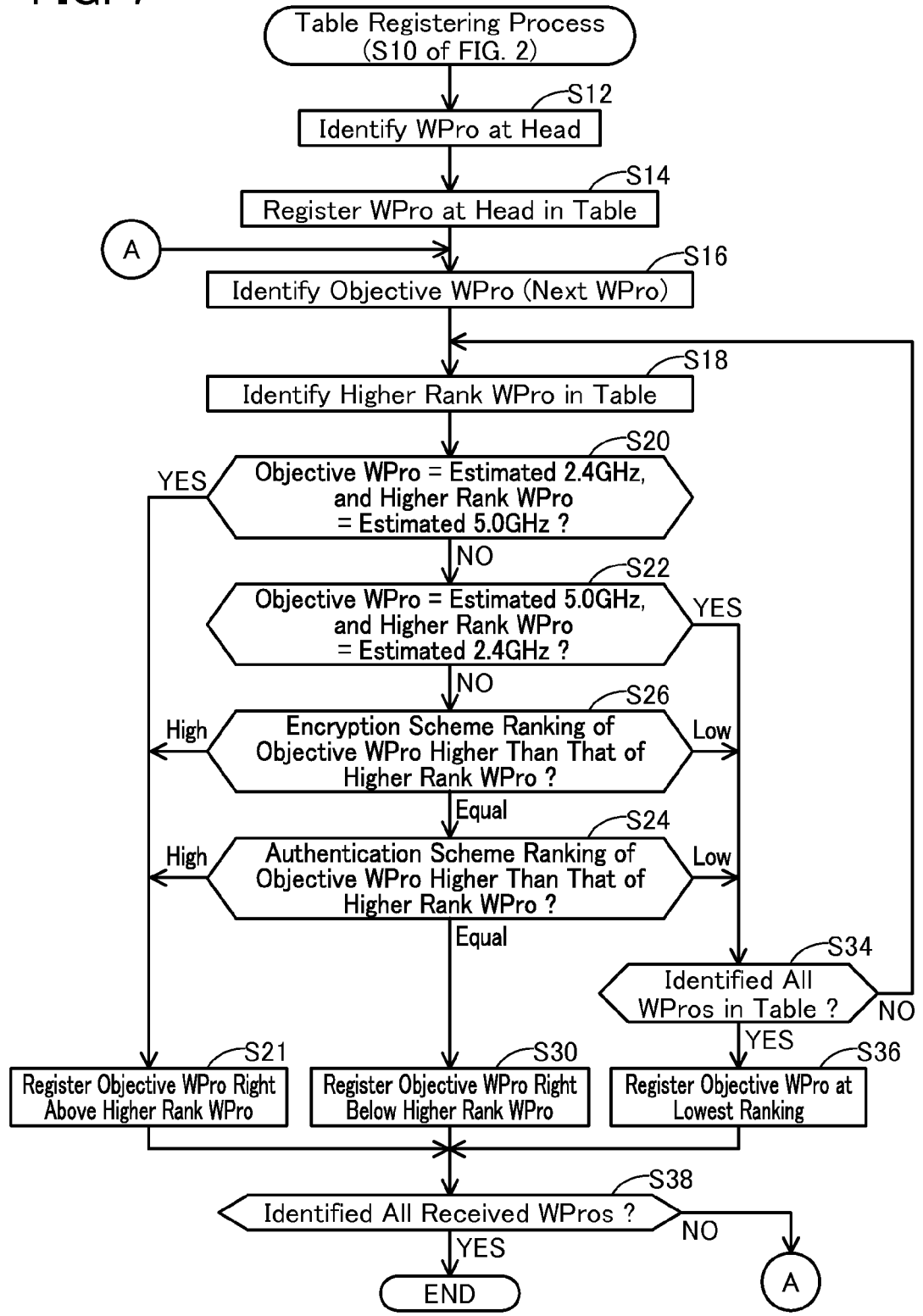
FIG. 7 shows a flowchart of a table registering process of a second embodiment.

Second Embodiment (Table Registering Process; FIG. 7)

In the present embodiment, a table registering process of FIG. 7 is executed instead of the table registering process of FIG. 3. In the table registering process of the present embodiment, unlike the table registering process of FIG. 3, S26 is executed prior to S24. That is, in the present embodiment, in the case for example where two WPRos are present having authentication schemes which have different security levels, the WPro which includes the encryption scheme having the higher security level is registered at the higher rank in the table 42 regardless of the difference in the security level of authentication schemes.

(Specific Cases; FIG. 8)

Next, the contents of specific cases implemented in accordance with the flowcharts of FIG. 2 and FIG. 7 will be described with reference to FIG. 8.

(Case E)

T402 to T412 are the same as T2 to T12 of case A of FIG. 5. The ranking of the encryption scheme "AES" included in the WPro1 is higher than the ranking of the encryption scheme "TKIP" included in the WPro2 (see the encryption ranking list 40 of FIG. 1). Consequently, the WPro1 is registered at a higher rank than the WPro2 in the table 42 (S10, FIG. 7). As a result, the MFP 10 selects the WPro1 in T414 (S40). T416 to T420 are the same as T16 to T20 of case A of FIG. 5.

As described above, the MFP 10 selects the WPro1 which includes the encryption scheme "AES" having a high security level from among the WPro1 and the WPro2 (T414). Then, the MFP 10 can establish the wireless connection with the AP 100 by using the WPro1 (T420). Thereby, the MFP 10 can appropriately join a wireless network having a comparatively high security level.

(Case F)

T502 to T512 are the same as T2 to T12 of case A of FIG. 5. However, they differ from case A in that the MFP 10 receives a WPro7 instead of the WPro2 from the AP 100 in T512. The WPro7 includes an SSID "TTT", the authentication scheme "WPAPSK", and the encryption scheme "AES".

The ranking of the encryption scheme "AES" included in the WPro1 and the ranking of the encryption scheme "AES" included in the WPro7 are equal, and the ranking of the authentication scheme "WPA2PSK" included in the WPro1 is higher than the ranking of the authentication scheme "WPAPSK" included in the WPro7 (see tables 38, 40 of FIG. 1). Consequently, the WPro1 is registered at a higher rank than the WPro7 in the table 42 (S10, FIG. 7). As a result, the MFP 10 selects the WPro1 in T514 (S40). T516 to T520 are the same as T16 to T20 of case A of FIG. 5.

As described above, in the case where the ranking of the encryption scheme "AES" included in the WPro1 and the ranking of the encryption scheme "AES" included in the WPro7 are equal, the MFP 10 selects the WPro1 which includes the authentication scheme "WPA2PSK" having a comparatively high security level from among the WPro1 and the WPro7 (T514). Then, the MFP 10 can establish a wireless connection with the AP 100 by using the WPro1 (T520). Thereby, the MFP 10 can appropriately join a wireless network having a comparatively high security level.

(Correspondence Relationship)

In case E, the WPro1 is an example of "first wireless profile" and "particular wireless profile". In case E, the WPro2 is an example of "second wireless profile". The encryption schemes "AES" and "TKIP" are examples of "first encryption scheme" and "second encryption scheme", respectively.

In case F, the WPro1 is an example of "first wireless profile" and "particular wireless profile". The WPro7 is an example of "second wireless profile". The encryption scheme "AES" is an example of "first encryption scheme" and "second encryption scheme". The authentication schemes "WPA2PSK" and "WPAPSK" are examples of "first authentication scheme" and "second authentication scheme", respectively.

Third Embodiment

In the present embodiment, as shown in FIG. 1, the network I/F 20 of the MFP 10 is configured to execute both a wireless communication using a carrier wave having a frequency of 2.4 GHz band, and a wireless communication using a carrier wave having a frequency of 5.0 GHz band. Moreover, only one MAC address is assigned to the network I/F 20. However, in a modification, two MAC addresses may be assigned to the network I/F 20. Further, in another modification, the network I/F 20 may be configured by a first interface for executing the wireless communication using the carrier wave having the frequency of 2.4 GHz band, and a second interface for executing the wireless communication using the carrier wave having the frequency of 5.0 GHz band and configured separately from the first interface.

(Table Registering Process; FIG. 9)

In the present embodiment, a table registering process of FIG. 9 is executed instead of the table registering process of FIG. 3. In the table registering process of the present embodiment, unlike the table registering process of FIGS. 3, S24 and S26 are executed prior to S22, and S20 is not executed. That is, in the present embodiment, in the case for example where two WPRos are present which include an estimated 5.0 GHz WPro and an estimated 2.4 GHz WPro, a WPro which includes an authentication scheme or encryption scheme having a higher security level is registered at a higher rank in the table 42 regardless of the estimation of the frequency bands. Further, e.g., in the case for example where the two WPRos have an equal security level, the estimated 5.0 GHz WPro is registered at a higher rank in the table 42 than the estimated 2.4 GHz WPro. Moreover, in a modification, the CPU 32 may execute S26 of FIG. 9 prior to S24.

Tables 42f, 42g of FIG. 10 are examples of the table 42 generated in the table registering process of FIG. 9. As shown in the table 42f, in the case where an estimated 5.0 GHz WPro and an estimated 2.4 GHz WPro are present, the estimated 2.4 GHz WPro which includes the authentication scheme "WPA2PSK" having a comparatively high security level is registered at a higher rank in the table 42f. Consequently, in the connecting process of FIG. 2, the CPU 32 selects the estimated 2.4 GHz WPro, which is the WPro having the highest rank in the table 42f (S40 of FIG. 2), and can establish the wireless connection with the AP 100 by using the estimated 2.4 GHz WPro (S42 to S50). Thus, according to the present embodiment, the MFP 10 can appropriately join a wireless network having a comparatively high security level.

Further, as shown in the table 42g, in the case where an estimated 5.0 GHz WPro and an estimated 2.4 GHz WPro are present, and the security level of these two WPRos is equal, the estimated 5.0 GHz WPro is registered at a higher rank than the estimated 2.4 GHz WPro. Consequently, in the connecting process of FIG. 2, the CPU 32 selects the estimated 5.0 GHz WPro, which is the WPro having the highest rank in the table 42g (S40 of FIG. 2), and can establish the wireless connection with the AP 100 by using the estimated 5.0 GHz WPro (S42 to S50). Thus, according to the present embodiment, in the case where two wireless networks having an equal security level are present, the MFP 10 can appropriately join a wireless network in which the carrier wave having the frequency of 5.0 GHz band is used. The reason for preferring the 5.0 GHz band wireless network is as follows.

First, the communication speed of the wireless communication using the carrier wave having the frequency of 5.0 GHz band is greater than the communication speed of the wireless communication using the carrier wave having the frequency of 2.4 GHz band. Consequently, the MFP 10 can preferentially join the 5.0 GHz band wireless network which is capable of executing high speed wireless communication. Further, a number of channels which can be used without the carrier waves interfering with one another (e.g., four or more) is greater in the wireless communication using the carrier wave having the frequency of 5.0 GHz band, than a number of channels which can be used without the carrier waves interfering with one another (e.g., three) in the wireless communication using the carrier wave having the frequency of 2.4 GHz band. Consequently, the MFP 10 can preferentially join the 5.0 GHz band wireless network which has a comparatively large number of channels and, consequently it is possible to appropriately suppress a lowering of communication speed caused by interference of the carrier waves in the wireless communication with the AP 100 due to the number of channels being insufficient.

Further, in the present embodiment, the processes of S42 to S50 of FIG. 2 are different from the first embodiment. That is, in S42, the CPU 32 first sends the Probe Req. signal to the target AP by using one of the carrier wave having the frequency of 2.4 GHz band or the carrier wave having the frequency of 5.0 GHz band. Specifically, the CPU 32 uses the carrier wave having the frequency of 2.4 GHz band in the case where the target WPro is an estimated 2.4 GHz WPro, and uses the carrier wave having the frequency of 5.0 GHz band in the case where the target WPro is an estimated 5.0 GHz WPro. In the case where the establishment of the wireless connection using the carrier wave of the one frequency succeeded (YES in S50), the CPU 32 proceeds to S56. Further, in the case where establishment of a wireless connection using the carrier wave of the one frequency failed (NO in S46, or NO in S50), the CPU 32 returns to S42 without proceeding directly to S54 (this point is not shown), and tries to establish a wireless connection with the target AP by using the carrier wave of the other frequency. In the case where the establishment of the wireless connection using the carrier wave of the other frequency succeeded (YES in S50), the CPU 32 proceeds to S56. Further, in the case where establishment of a wireless connection using the carrier wave of the other frequency failed (NO in S46, or NO in S50), the CPU 32 proceeds to S54. As described above, in S42 to S50, the one frequency which corresponds to the estimation of the frequency of the target WPro is used first, and therefore there is a high likelihood of success in establishing the wireless connection using the carrier wave of the one frequency. That is, the CPU 32 may quickly establish the wireless connection with the AP 100 without trying to establish a wireless connection using the carrier wave of the other frequency.

Fourth Embodiment

In the present embodiment, after executing the table registering process of FIG. 9, the CPU 32 of the MFP 10 may execute an exchanging process for exchanging the ranking of the estimated 5.0 GHz WPro and the estimated 2.4 GHz WPro, which have an equal security level, in the table 42.

The CPU 32 first judges whether a set of the estimated 5.0 GHz WPro and the estimated 2.4 GHz WPro in which the security level is equal are in the table 42 after the table registering process of FIG. 9 has been executed. In the case where there is not the above set of the two WPRos, the CPU 32 does not execute the exchanging process. On the other hand, in the case where there is a set of the two WPRos, the CPU 32 proceeds to the process below. Moreover, in this case, the estimated 5.0 GHz WPro is registered at a higher rank than the estimated 2.4 GHz WPro in the set of two WPRos (see S22, S20 of FIG. 9).

The CPU 32 judges whether the field intensity of the carrier wave having the frequency of 5.0 GHz band and the field intensity of the carrier wave having the frequency of 2.4 GHz band satisfy the following conditions. The conditions are the field intensity of the carrier wave having the frequency of 5.0 GHz band being less than a threshold Th, and the field intensity of the carrier wave having the frequency of 5.0 GHz band being less than the field intensity of the carrier wave having the frequency of 2.4 GHz band (called "first condition" below). In the case where the first condition is satisfied, the CPU 32 executes the exchanging process for exchanging the ranking of the two WPRos in the above set of two WPRos. Thereby, the state changes from the estimated 5.0 GHz WPro being registered at a higher rank than the estimated 2.4 GHz WPro to a state of the estimated 2.4 GHz WPro being registered at a higher rank than the estimated 5.0 GHz WPro. On the other hand, in the case where the first condition is not satisfied, the CPU 32 does not execute the exchanging process. The conditions for the first condition not being satisfied are the field intensity of the carrier wave having the frequency of 5.0 GHz band being equal to or above the threshold Th, or the field intensity of the carrier wave having the frequency of 5.0 GHz band being equal to or above the field intensity of the carrier wave having the frequency of 2.4 GHz band. These conditions are called "second condition" below.

The tables 42g, 42h in which the two WPRos are registered in the fourth embodiment are shown in FIG. 11. The table 42g is an example of a table after the table registering process of FIG. 9 has been executed. In this case, the estimated 5.0 GHz WPro and the estimated 2.4 GHz WPro are present and, in the case where the security level of these two WPRos is equal, the estimated 5.0 GHz WPro is registered at a higher rank than the estimated 2.4 GHz WPro.

The table 42h is an example of a table in the case where the exchanging process has been executed for the table 42g. As described above, the case of executing the exchanging process is the case where the first condition is satisfied. In this case, the estimated 5.0 GHz WPro and the estimated 2.4 GHz WPro are present and, in the case where the security level of these two WPRos is equal, unlike the third embodiment, the estimated 2.4 GHz WPro is registered at a higher rank than the estimated 5.0 GHz WPro.

Moreover, in the case where the second condition is satisfied, the table 42g does not change.

(Specific Cases)

Next, the contents of specific cases implemented in accordance with the flowchart of FIG. 2 will be described with reference to FIG. 12.

(Case G; FIG. 12)

In the present case, the field intensity of the carrier wave having the frequency of 5.0 GHz band is less than the threshold Th, and the field intensity of the carrier wave having the frequency of 5.0 GHz band is less than the field intensity of the carrier wave having the frequency of 2.4 GHz band (i.e., the first condition is satisfied). Moreover, the MFP 10 can measure the field intensity by using an Association Req. signal, etc. received in T612, to be described. T602 to T612 are the same as T2 to T12 of case A of FIG. 5. However, in T612, there is a difference from case A in that the MFP 10 receives a WPro8 instead of the WPro2 from the AP 100. The WPro8 includes an SSID "SSS-5G", the authentication scheme "WPA2PSK", and the encryption scheme "AES".

The ranking of the authentication scheme "WPA2PSK" included in the WPro1 and the ranking of the authentication scheme "WPA2PSK" included in the WPro8 are equal, and the ranking of the encryption scheme "AES" included in the WPro1 and the ranking of the encryption scheme "AES" included in the WPro8 are equal. Further, the CPU 32 judges that the WPro1 is an estimated 2.4 GHz WPro. Since the SSID "SSS-5G" included in the WPro8 includes the character string "-5G", the CPU 32 judges that the WPro8 is an estimated 5.0 GHz WPro. As a result, the WPro8 is registered at a higher rank than the WPro1 in the table 42 after the table registering process of FIG. 9 has been executed. However, as described above, since the first condition is satisfied, the WPro1 and the WPro8 are exchanged. That is, the WPro1 changes to a state of being registered at a higher rank than the WPro8. As a result, the MFP 10 selects the WPro1 in T614 (S40 of FIG. 2). T616 to T620 are the same as T16 to T20 of case A of FIG. 5.

As described above, in the case where the WPro8 (i.e., the estimated 5.0 GHz WPro) and the WPro1 (i.e., the estimated 2.4 GHz WPro) are present, the security level of these two WPRos is equal, and the first condition is satisfied, the MFP 10 selects the WPro1 (T614). Then, the MFP 10 can establish a wireless connection with the AP 100 by using the WPro1 (T620). Thereby, the MFP 10 can appropriately join a wireless network which uses a carrier wave having a frequency in which the field intensity is comparatively strong.

(Case H; FIG. 12)

In the present case, the field intensity of the carrier wave having the frequency of 5.0 GHz band is less than the threshold Th, and the field intensity of the carrier wave having the frequency of 5.0 GHz band is equal to the field intensity of the carrier wave having the frequency of 2.4 GHz band (i.e., the second condition is satisfied). T702 to T712 are the same as T602 to T612 of case G.

The ranking of the authentication scheme "WPA2PSK" included in the WPro1 and the ranking of the authentication scheme "WPA2PSK" included in the WPro8 are equal, and the ranking of the encryption scheme "AES" included in the WPro1 and the ranking of the encryption scheme "AES" included in the WPro8 are equal. Further, the CPU 32 judges that the WPro1 is an estimated 2.4 GHz WPro, and judges that the WPro8 is an estimated 5.0 GHz WPro. As a result, the WPro8 is registered at a higher rank than the WPro1 in the table 42 after the table registering process of FIG. 9 has been executed. Further, as described above, since the second condition is satisfied, the WPro1 and the WPro8 are not exchanged. That is, the state of the WPro8 being registered at a higher rank than the WPro1 does not change. Consequently, the MFP 10 selects the WPro8 in T714 (S40 of FIG. 2).

In T716, the MFP 10 sends a Probe Req. signal which includes the SSID "SSS-5G" included in the WPro8 to the AP 100 (S42 of FIG. 2) and, in T718, receives from the AP 100 a Probe Res. signal which includes a WPro equal to the WPro1 (YES in S46). T720 is the same as T20 of case A of FIG. 5.

As described above, in the case where the WPro8 (i.e., the estimated 5.0 GHz WPro) and the WPro1 (i.e., the estimated 2.4 GHz WPro) are present, the security level of these two WPRos is equal, and the second condition is satisfied, the MFP 10 selects the WPro8 (T714). The MFP 10 can establish the wireless connection with the AP 100 by using the WPro8 (T720). Thereby, the MFP 10 can appropriately join a wireless network which uses the carrier wave having the frequency of 5.0 GHz band. That is, the same effect as the third embodiment can be achieved.

Modification 1

In the embodiments described above, "predetermined wireless connection scheme" is the WPS scheme. However, "predetermined wireless connection scheme" may be another automatic wireless setting scheme (e.g., AOSS (abbreviation of AirStation One-Touch Secure System)).

Modification 2

In the embodiments described above, "communication apparatus" is not restricted to a multi-function peripheral (i.e., the MFP 10) configured to execute the print function and the scan function, but may be a printer configured to execute only the print function from among the print function and the scan function, or may be a scanner configured to execute only the scan function from among the print function and the scan function. Further, "communication apparatus" may be a device (e.g., PC, server, portable terminal (mobile telephone, smartphone, PDA, etc.)) which executes a function (e.g., an image display function, a data calculation function) different from the print function and the scan function. That is, "communication apparatus" includes all devices capable of establishing a wireless connection in accordance with a predetermined wireless connection scheme.

Modification 3

In the first embodiment, the CPU 32 of the MFP 10 registers the WPro received first at a higher rank (S16, S30 of FIG. 3). That is, the CPU 32 preferentially selects the WPro received first (S40 of FIG. 2). Instead, e.g., the CPU 32 may register the WPro received last at a higher rank, and preferentially select the WPro received last. That is, "particular order" may be an order in which, of the first wireless profile and the second wireless profile, the wireless profile which is received first is placed in front, or the wireless profile which is received last is placed in front.

Modification 4

In the first embodiment, the MFP 10 is configured to execute a wireless communication using a carrier wave having a frequency of 2.4 GHz band, but is not configured to execute a wireless communication using a carrier wave having another frequency. Instead, e.g., the MFP 10 may be capable of executing a wireless communication using a carrier wave having a frequency of 5.0 GHz band, but not be capable of executing a wireless communication using a carrier wave having another frequency. Further, in the third embodiment, the MFP 10 is capable of executing both a wireless communication using a carrier wave having a frequency of 2.4 GHz and a wireless communication using a carrier wave having a frequency of 5.0 GHz band. Instead, e.g., the MFP 10 may be capable of executing both a wireless communication using a carrier wave having a frequency of 5.2 GHz band, and a wireless communication using a carrier wave having a frequency of 5.6 GHz band. In this case, unlike the first embodiment, the MFP 10 may register the estimated 5.0 GHz WPro at a higher rank than the estimated 2.4 GHz WPro in the table registering process of FIG. 3 and, in S40 of FIG. 2, may preferentially select the estimated 5.0 GHz WPro rather than the estimated 2.4 GHz WPro. That is, "first frequency" and "second frequency" may be any frequency.

Modification 5

In the embodiments described above, the CPU 32 of the MFP 10 judges that the WPro is an estimated 5.0 GHz WPro in the case where the SSID included in the WPro includes the character string "-5G", and judges that the WPro is an estimated 2.4 GHz WPro in the case where the SSID included in the WPro does not include the character string "-5G". Instead, the CPU 32 may judge that the WPro is an estimated 5.0 GHz WPro in the case where the SSID included in the WPro includes a character string other than the character string "-5G" (e.g., any of "_5G", "_A", "-A", "-A-"), and may judge that the WPro is an estimated 2.4 GHz WPro in the case where the SSID included in the WPro does not include the above character string. Further, the CPU 32 may judge whether the WPro is an estimated 5.0 GHz WPro or an estimated 2.4 GHz WPro based on information other than the character string included in the SSID (e.g., information received from the AP 100). That is, the CPU 32 may judge that the WPro is an estimated 5.0 GHz WPro in the case where the information indicates that the WPro is a WPro (5.0 GHz), and judge that the WPro is an estimated 2.4 GHz WPro in the case where the information indicates that the WPro is a WPro (2.4 GHz).

Modification 6

In the embodiments described above, the CPU 32 of the MFP 10 implements each process in FIG. 2, FIG. 3, FIG. 7, and FIG. 9 by executing programs (i.e., software). Instead, at least one process of each process in FIG. 2, FIG. 3, FIG. 7, and FIG. 9 may be implemented by hardware such as a logic circuit.

What is claimed is:

1. A communication apparatus comprising:
a processor; and
a memory storing computer-readable instructions therein, the computer-readable instructions, when executed by the processor, causing the communication apparatus to perform:
receiving a first wireless profile and a second wireless profile from an access point after a wireless connecting operation for establishing a wireless connection with the access point in accordance with a predetermined wireless connection scheme has been performed by a user, the first wireless profile being used in a first wireless network formed by the access point, and the second wireless profile being used in a second wireless network formed by the access point, the first wireless profile and the second wireless profile being used in each network formed by the same access point;
selecting a particular wireless profile from among the first wireless profile and the second wireless profile by comparing a security level of the first wireless profile and a security level of the second wireless profile,
the particular wireless profile being:
the first wireless profile in a case where the security level of the first wireless profile is higher than the security level of the second wireless profile, and
the second wireless profile in a case where the security level of the second wireless profile is higher than the security level of the first wireless profile; and
trying to establish the wireless connection with the access point using the selected particular wireless profile,
wherein the particular wireless connection scheme is a scheme for establishing the wireless connection with the access point without an identifier for authentication for establishing the wireless connection being inputted by the user to any of the communication apparatus and the access point.

2. The communication apparatus as in claim 1, wherein:
the receiving includes receiving a plurality of wireless profiles including the first wireless profile and the second wireless profile from the access point,
each of the plurality of wireless profiles is used in one of a plurality of wireless networks formed by the access point, and
the selecting includes selecting, from among the plurality of wireless profiles, the particular wireless profile used in a wireless network having the highest security level among the plurality of wireless networks.

3. The communication apparatus as in claim 1, wherein:
the first wireless profile includes a first authentication scheme,
the second wireless profile includes a second authentication scheme, and
the selecting includes selecting, as the particular wireless profile, the first wireless profile which includes the first authentication scheme having a security level which is higher than a security level of the second authentication scheme, in a case where the security level of the first authentication scheme and the security level of the second authentication scheme are different.

4. The communication apparatus as in claim 3, wherein:
the first wireless profile further includes a first encryption scheme,
the second wireless profile further includes a second encryption scheme, and
the selecting includes selecting, as the particular wireless profile, the first wireless profile which includes the first encryption scheme having a security level which is higher than a security level of the second encryption scheme, in a case where the security level of the first authentication scheme and the security level of the second authentication scheme are identical.

5. The communication apparatus as in claim 4, wherein:
the receiving includes sequentially receiving the first wireless profile and the second wireless profile from the access point in a particular order, and
the selecting includes selecting the particular wireless profile using the particular order, in a case where the security level of the first authentication scheme and the security level of the second authentication scheme are identical and the security level of the first encryption scheme and the security level of the second encryption scheme are identical.

6. The communication apparatus as in claim 1, wherein:
the first wireless profile includes a first encryption scheme,
the second wireless profile includes a second encryption scheme, and
the selecting includes selecting, as the particular wireless profile, the first wireless profile which includes the first encryption scheme having a security level which is higher than a security level of the second encryption scheme, in a case where the security level of the first encryption scheme and the security level of the second encryption scheme are different.

7. The communication apparatus as in claim 6, wherein:
the first wireless profile further includes a first authentication scheme,
the second wireless profile further includes a second authentication scheme, and
the selecting includes selecting, as the particular wireless profile, the first wireless profile which includes the first authentication scheme having a security level which is higher than a security level of the second authentication scheme, in a case where the security level of the first encryption scheme and the security level of the second encryption scheme are identical.

8. The communication apparatus as in claim 7, wherein:
the receiving includes sequentially receiving the first wireless profile and the second wireless profile from the access point in a particular order, and
the selecting includes selecting the particular wireless profile using the particular order, in a case where the security level of the first authentication scheme and the security level of the second authentication scheme are identical and the security level of the first encryption scheme and the security level of the second encryption scheme are identical.

9. The communication apparatus as in claim 1, further comprising:
an interface configured to execute a first type of wireless communication using a carrier wave of a first frequency, wherein the interface is not configured to execute a second type of wireless communication using a carrier wave of a second frequency different from the first frequency,
wherein the selecting includes selecting the particular wireless profile used in a wireless network in which the first type of wireless communication is executed among the first wireless network and the second wireless network.

10. The communication apparatus as in claim 9, wherein:
a wireless profile used in a wireless network in which the first type of wireless communication does not include a particular character string,
a wireless profile used in a wireless network in which the second type of wireless communication includes the particular character string, and
the computer-readable instructions, when executed by the processor, cause the communication apparatus to further perform:
identifying a wireless profile which does not include the particular character string from among the first wireless profile and the second wireless profile,
wherein the selecting includes selecting the identified wireless profile as the particular wireless profile.

11. The communication apparatus as in claim 9, wherein the computer-readable instructions, when executed by the processor, cause the communication apparatus to further perform:
judging, for each of the first wireless profile and the second wireless profile, whether the wireless profile is used in a wireless network in which the first type of wireless communication is executed or used in a wireless network in which the second type of wireless communication is executed,
wherein the selecting includes selecting the particular wireless profile, in a case where it is judged that each of the first wireless profile and the second wireless profile is used in the wireless network in which the first type of wireless communication is executed.

12. The communication apparatus as in claim 1, further comprising:
an interface configured to execute a first type of wireless communication using a carrier wave of a first frequency and execute a second type of wireless communication using a carrier wave of a second frequency being different from the first frequency,
wherein the selecting includes selecting the particular wireless profile used in a wireless network in which the second type of wireless communication is executed among the first wireless network and the second wireless network, in a case where a security level of the first wireless network and a security level of the second wireless network are identical.

13. The communication apparatus as in claim 1, further comprising:
an interface configured to execute a first type of wireless communication using a carrier wave of a first frequency and execute a second type of wireless communication using a carrier wave of a second frequency being different from the first frequency,
wherein the selecting includes:
selecting the particular wireless profile used in a wireless network in which the first type of wireless communication is executed among the first wireless network and the second wireless network, in a case where a security level of the first wireless network and a security level of the second wireless network are identical and a field intensity of the first frequency is larger than a field intensity of the second frequency; and
selecting the particular wireless profile used in a wireless network in which the second type of wireless communication is executed among the first wireless network and the second wireless network, in a case where the security level of the first wireless network and the security level of the second wireless network are identical and the field intensity of the first frequency is equal to or less than the field intensity of the second frequency.

14. The communication apparatus as in claim 13, wherein the second frequency is larger than the first frequency.

15. A non-transitory computer-readable storage medium storing computer-readable instructions for a communication apparatus,
wherein the computer-readable instructions, when executed by a processor of the communication apparatus, cause the communication apparatus to perform:
receiving a first wireless profile and a second wireless profile from an access point after a wireless connecting operation for establishing a wireless connection with the access point in accordance with a predetermined wireless connection scheme has been performed by a user, the first wireless profile being used in a first wireless network formed by the access point, and the second wireless profile being used in a second wireless network formed by the access point, first wireless profile and the second wireless profile being used in each network formed by the same access point;
selecting a particular wireless profile from among the first wireless profile and the second wireless profile by comparing a security level of the first wireless profile and a security level of the second wireless profile
the particular wireless profile being:
the first wireless profile in a case where the security level of the first wireless profile is higher than the security level of the second wireless profile, and
the second wireless profile in a case where the security level of the second wireless profile is higher than the security level of the first wireless profile; and
trying to establish the wireless connection with the access point using the particular wireless profile,
wherein the particular wireless connection scheme is a scheme for establishing the wireless connection with the access point without an identifier for authentication for establishing the wireless connection being inputted by the user to any of the communication apparatus and the access point.

* * * * *